(12) United States Patent
Williams et al.

(10) Patent No.: US 12,465,329 B2
(45) Date of Patent: Nov. 11, 2025

(54) CURVED CIRCUIT SUBSTRATE FOR INTRALUMINAL ULTRASOUND IMAGING ASSEMBLY

(71) Applicant: KONINKLIJKE PHILIPS N.V., Eindhoven (NL)

(72) Inventors: Nathan Andrew Williams, San Diego, CA (US); David Kenneth Wrolstad, Fallbrook, CA (US); Reynaldo Borja Halili, San Diego, CA (US); Megan Danielle Friedlander, San Diego, CA (US); Maritess Minas, San Diego, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 362 days.

(21) Appl. No.: 18/015,913

(22) PCT Filed: Jul. 19, 2021

(86) PCT No.: PCT/EP2021/070095
§ 371 (c)(1),
(2) Date: Jan. 12, 2023

(87) PCT Pub. No.: WO2022/018008
PCT Pub. Date: Jan. 27, 2022

(65) Prior Publication Data
US 2023/0285000 A1 Sep. 14, 2023

Related U.S. Application Data

(60) Provisional application No. 63/056,172, filed on Jul. 24, 2020.

(51) Int. Cl.
*A61B 8/00* (2006.01)
*A61B 8/12* (2006.01)

(52) U.S. Cl.
CPC ............... *A61B 8/445* (2013.01); *A61B 8/12* (2013.01); *A61B 8/4483* (2013.01)

(58) Field of Classification Search
CPC .......... A61B 8/445; A61B 8/12; A61B 8/4483
See application file for complete search history.

(56) References Cited

U.S. PATENT DOCUMENTS

| 6,776,763 B2 | 8/2004 | Nix |
| 7,226,417 B1 | 6/2007 | Eberle |

(Continued)

FOREIGN PATENT DOCUMENTS

| WO | 2020144070 A1 | 7/2020 |

OTHER PUBLICATIONS

International Search Report and Written Opinion of PCT/EP2021/070095, dated Nov. 11, 2021.

*Primary Examiner* — Anh T Nguyen
*Assistant Examiner* — Younhee Choi

(57) ABSTRACT

An intraluminal ultrasound imaging device includes a flexible elongate member and an ultrasound imaging assembly coupled to a distal portion of the flexible elongate member. The ultrasound imaging assembly includes a flexible substrate comprising a scanner body portion, one or more control circuits mounted on the scanner body portion, and one or more transducer elements mounted on the scanner body portion. The ultrasound imaging assembly also includes an attachment portion extending proximally from the scanner body portion. The attachment portion defines a path that curves in a first direction and different second direction, and includes a plurality of conductive traces in electrical communication with the one or more control circuits. The plurality of conductive traces follows the curved path of the attachment portion, and each conductive (Continued)

trace comprises a pattern that bends relative to the curved path of the attachment portion.

16 Claims, 20 Drawing Sheets

(56) References Cited

U.S. PATENT DOCUMENTS

| | | |
|---|---|---|
| 7,846,101 B2 | 12/2010 | Eberle |
| 9,226,689 B2 * | 1/2016 | Jacobsen ............... H05K 1/028 |
| 2009/0292199 A1 * | 11/2009 | Bielewicz ............. A61B 8/445 |
| | | 600/459 |
| 2011/0166455 A1 * | 7/2011 | Cully ................... A61B 8/4245 |
| | | 600/463 |
| 2015/0305710 A1 | 10/2015 | Stigall |
| 2017/0143297 A1 * | 5/2017 | Chaggares ............... A61B 8/12 |
| 2017/0209898 A1 * | 7/2017 | Henneken ............. B06B 1/0292 |
| 2019/0069878 A1 * | 3/2019 | Irie .................... A61B 1/00114 |
| 2021/0069749 A1 * | 3/2021 | Durocher ............. B06B 1/0292 |
| 2021/0113180 A1 * | 4/2021 | Stigall .................. G01S 7/52079 |
| 2022/0061805 A1 * | 3/2022 | Minas .................... A61B 8/445 |

* cited by examiner

CURVED CIRCUIT SUBSTRATE FOR INTRALUMINAL ULTRASOUND IMAGING ASSEMBLY

TECHNICAL FIELD

The present disclosure relates generally to intraluminal ultrasound imaging and, in particular, to the structure of an ultrasound imaging assembly at a distal portion of a catheter or guidewire. For example, a flexible substrate of an ultrasound imaging assembly includes strain relief features that increase its flexibility to allow for bending (e.g., during navigation through the tortuous pathways of a human vascular system) after the substrate has been rolled into a cylindrical shape.

BACKGROUND

Intravascular ultrasound (IVUS) imaging is widely used in interventional cardiology as a diagnostic tool for assessing a diseased vessel, such as an artery, within the human body to determine the need for treatment, to guide the intervention, and/or to assess a treatment's effectiveness. An IVUS device including one or more ultrasound transducers is passed into the vessel and guided to the area to be imaged. The transducers emit ultrasonic energy in order to create an image of the vessel of interest. Ultrasonic waves are partially reflected by discontinuities arising from tissue structures (such as the various layers of the vessel wall), red blood cells, and other features of interest. Echoes from the reflected waves are received by the transducer and passed along to an IVUS imaging system. The imaging system processes the received ultrasound echoes to produce a cross-sectional image of the vessel where the device is placed.

Solid-state (also known as synthetic-aperture) IVUS catheters are one of the two types of IVUS devices commonly used today, the other type being the rotational IVUS catheter. Solid-state IVUS catheters carry a scanner assembly that includes an array of ultrasound transducers distributed around its circumference along with one or more integrated circuit controller chips mounted adjacent to the transducer array. The controllers select individual acoustic elements (or groups of elements) for transmitting an ultrasound pulse and for receiving the ultrasound echo signal. By stepping through a sequence of transmit-receive pairs, the solid-state IVUS system can synthesize the effect of a mechanically scanned ultrasound transducer but without moving parts (hence the solid-state designation). Since there is no rotating mechanical element, the transducer array can be placed in direct contact with the blood and vessel tissue with minimal risk of vessel trauma. Furthermore, because there is no rotating element, the electrical interface is simplified. The solid-state scanner can be wired directly to the imaging system with a simple electrical cable and a standard detachable electrical connector, rather than the complex rotating electrical interface required for a rotational IVUS device.

Existing solid-state devices present several challenges. The electrical cable is attached to a flex circuit of an IVUS imaging assembly close to electronic components. Attaching the cables in such close proximity can potentially harm operation of the electronic components. The cable connection also increases the stiff length at the distal portion of a catheter, which reduces the catheter's ability to traverse tortuous vasculature without damage to electrical traces. Additionally, the difference in rigidity between the distal imaging assembly and the flexible catheter body creates a weak point in the construction of the IVUS imaging device that is susceptible to kinks and bends. The stress and strain at these kinks and bends can increase the result of material failure, as well as breakage of the electrical conductors and connects with the flex circuit. Ensuring that conductive traces formed in the flex circuit stay operational while being handled during the manufacturing process is also a challenge. Assembly of a solid-state IVUS device sometimes involves rolling a flex circuit around the circumference of the catheter. Such steps during the manufacturing can be difficult to automate in a reproducible manner because of the added thickness of some portions of the flex circuit.

SUMMARY

An intraluminal imaging device, such as an intravascular ultrasound (IVUS) imaging catheter, is described herein. The ultrasound imaging assembly at the distal portion of the catheter includes a flexible substrate rolled into a substantially cylindrical form. The flexible substrate has a distal portion with acoustic elements positioned thereon, as well as a proximal portion including weld pads to which electrical conductors are attached. Electrical traces formed on the flexible substrate connect the ultrasound imaging assembly to the weld pads. When the catheter is subjected to bending, the resulting strain on the flexible substrate can cause fracturing of one or more electrical traces, leading to a failure of the imaging catheter. Disclosed are flexible substrates and electrical traces that include strain relief features to minimize the probability of fracturing an electrical trace when the catheter is bent.

The flex circuit substrate disclosed herein has particular, but not exclusive, utility for intraluminal medical devices such as catheters and guidewires. One general aspect of the flex circuit substrate includes an intraluminal ultrasound imaging device. The intraluminal ultrasound imaging device also includes a flexible elongate member configured to be positioned within a body lumen of a patient; and an ultrasound imaging assembly coupled to a distal portion of the flexible elongate member and including: a flexible substrate including a scanner body portion and an attachment portion extending proximally from the scanner body portion, where the attachment portion defines a curved path including a first curve curving in a first direction and a second curve curving in a different second direction; one or more control circuits mounted on the scanner body portion; one or more transducer elements mounted on the scanner body portion and in communication with the one or more control circuits; and a plurality of conductive traces disposed on the attachment portion, where the plurality of conductive traces is in electrical communication with the one or more control circuits, where the plurality of conductive traces follows the curved path of the attachment portion, and where each conductive trace includes a pattern that bends relative to the curved path of the attachment portion. Other embodiments of this aspect may include corresponding computer systems, apparatus, and computer programs recorded on one or more computer storage devices, each configured to perform actions of the methods.

Implementations may include one or more of the following features. In some embodiments, the curved path includes a horseshoe shape. In some embodiments, the curved path includes a serpentine shape. In some embodiments, the pattern of each conductive trace includes a sinusoidal shape. In some embodiments, the pattern of each conductive trace includes a braided shape. In some embodiments, the pattern of each conductive trace includes redundant zig-zag patterns periodically connected to one another. In some embodiments, the flexible elongate member includes an inner member, where a proximal region of the attachment portion is attached to the inner member, and where an intermediate region of the attachment portion is detached from the inner member such that the intermediate region of the attachment portion is configured to move relative to the inner member. In some embodiments, a width of the proximal region of the attachment portion is greater than a width of the intermediate region of the attachment portion. In some embodiments, the flexible elongate member further includes an outer member positioned around the inner member and the attachment portion of the flexible substrate, where the outer member retains the attachment portion of the flexible substrate in a rolled configuration such that the attachment portion is disposed around at least a portion of a circumference of the inner member and within an annular space between the inner member and the outer member. In some embodiments, the proximal region of the attachment portion includes a plurality of electrical contacts coupled to the plurality of conductive traces, where the plurality of conductors are electrically connected to the plurality of conductive traces via the plurality of electrical contacts. In some embodiments, the plurality of conductors extends within the annular space between the inner member and the outer member. In some embodiments, the flexible elongate member includes a longitudinal axis, and the proximal region of the attachment portion includes a rectangular shape and is aligned with the longitudinal axis. In some embodiments, a region of the attachment portion between the first and second curve is oriented at an angle of 60-90 degrees relative to the longitudinal axis. In some embodiments, the scanner body portion is positioned around the rigid tubular member. In some embodiments, the attachment portion is positioned proximally of the one or more transducer elements and the one or more control circuits. In some embodiments, the attachment portion extends proximally of the rigid tubular member. In some embodiments, a width of the scanner body portion is greater than a width of the attachment portion.

One general aspect includes an intravascular ultrasound (IVUS) imaging catheter. In some embodiments, the intravascular ultrasound also includes a flexible elongate member configured to be positioned within a blood vessel of a patient, the flexible elongate member including a longitudinal axis. In some embodiments, the intravascular ultrasound also includes an ultrasound scanner assembly coupled to a distal portion of the flexible elongate member and including: a flexible substrate including a scanner body portion and an attachment portion extending proximally from the scanner body portion; a plurality of control circuits mounted on the scanner body portion; a plurality of transducer elements mounted on the scanner body portion and in communication with the plurality of control circuits, where the plurality of transducer elements is disposed in a circumferential arrangement around the longitudinal axis; and a plurality of conductive traces disposed on the attachment portion and in electrical communication with the plurality of control circuits. In some embodiments, the attachment portion includes a first curve curving in a first direction and a second curve curving in a different second direction, the first curve and second curve defining a curved path. In some embodiments, the plurality of conductive traces follows the curved path. In some embodiments, each conductive trace includes a pattern that bends relative to the curved path.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
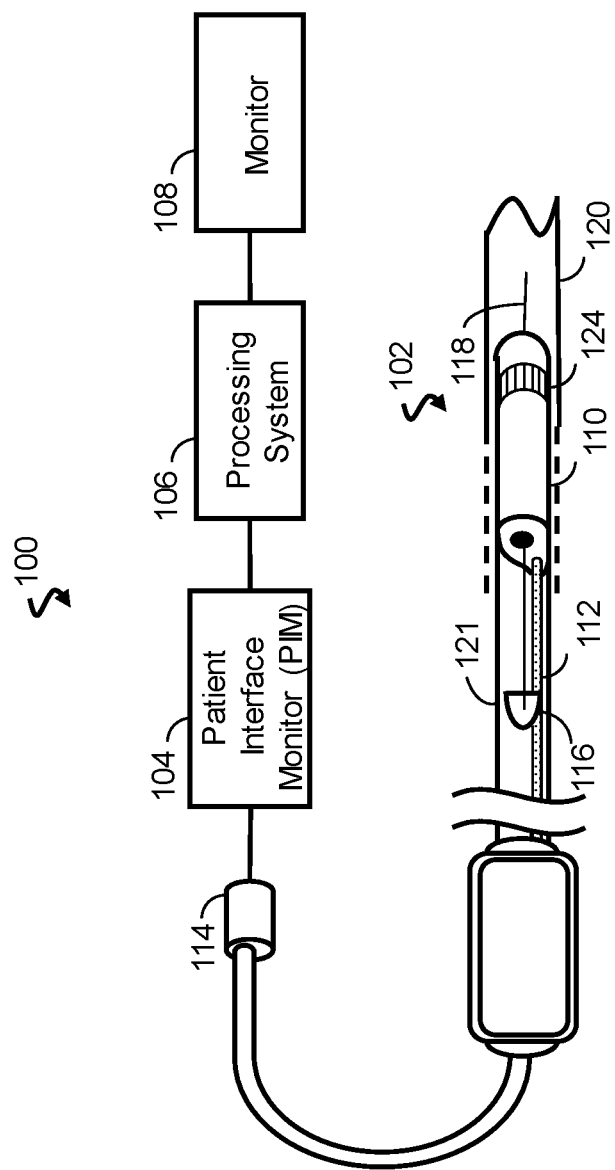
FIG. 1 is a diagrammatic schematic view of an intraluminal imaging system, according to aspects of the present disclosure.

An intraluminal imaging device, such as an intravascular ultrasound (IVUS) imaging catheter, is described herein. The ultrasound imaging assembly at the distal portion of the catheter includes a flexible substrate. The flexible substrate has a distal portion with acoustic elements positioned thereon, as well as a proximal portion including weld pads to which electrical conductors are attached. Electrical traces formed on the flexible substrate connect the ultrasound imaging assembly to the weld pads. As part of the manufacturing process, the flexible substrate is rolled into a cylindrical shape around a rigid tubular body or ferrule. Further, a proximal attachment portion of the flexible substrate is coupled to a flexible inner catheter member. The proximal attachment portion has electrical contacts or pads that are connected to electrical conductors that extend along a length of catheter body. However, the catheter may be subjected to bending, either during the manufacturing process, during normal handling, or during navigation through anatomy such as the tortuous pathways of a human vascular system. Such bending can cause strain on the flexible substrate, particularly to the proximal attachment portion, which can in turn lead to fracturing of one or more electrical traces, resulting in a failure of the imaging catheter. Disclosed are flexible substrates and electrical traces that include strain relief features to minimize the chance of an electrical trace fracturing when the catheter is bent.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic schematic view of an ultrasound imaging system 100, in accordance with aspects of the present disclosure. The ultrasound imaging system 100 can be an intraluminal imaging system. In some instances, the system 100 can be an intravascular ultrasound (IVUS) imaging system. The system 100 may include an intraluminal imaging device 102 such as a catheter, guide wire, or guide catheter, a patient interface module (PIM) 104, a processing system or console 106, and a monitor 108. The intraluminal imaging device 102 can be an ultrasound imaging device. In some instances, the device 102 can be an IVUS imaging device, such as a solid-state IVUS device.

At a high level, the IVUS device 102 emits ultrasonic energy, or ultrasound signals, from a transducer array 124 included in scanner assembly or scanner body 110 mounted near a distal end of the catheter device. The ultrasonic energy is reflected by tissue structures in the medium, such as a vessel 120, or another body lumen surrounding the scanner assembly or scanner body 110, and the ultrasound echo signals are received by the transducer array 124. In that regard, the device 102 can be sized, shaped, or otherwise configured to be positioned within the body lumen of a patient. The PIM 104 transfers the received echo signals to the console or computer 106 where the ultrasound image (including the flow information) is reconstructed and displayed on the monitor 108. The console or computer 106 can include a processor and a memory. The computer or computing device 106 can be operable to facilitate the features of the IVUS imaging system 100 described herein. For example, the processor can execute computer readable instructions stored on the non-transitory tangible computer readable medium.

The PIM 104 facilitates communication of signals between the IVUS console 106 and the scanner assembly 110 included in the IVUS device 102. This communication includes the steps of: (1) providing commands to integrated circuit controller chip(s) 206A, 206B, illustrated in FIG. 2, included in the scanner assembly 110 to select the particular transducer array element(s), or acoustic element(s), to be used for transmit and receive, (2) providing the transmit trigger signals to the integrated circuit controller chip(s) 206A, 206B included in the scanner assembly 110 to activate the transmitter circuitry to generate an electrical pulse to excite the selected transducer array element(s), and/or (3) accepting amplified echo signals received from the selected transducer array element(s) via amplifiers included on the integrated circuit controller chip(s) 206 of the scanner assembly 110. In some embodiments, the PIM 104 performs preliminary processing of the echo data prior to relaying the data to the console 106. In examples of such embodiments, the PIM 104 performs amplification, filtering, and/or aggregating of the data. In an embodiment, the PIM 104 also supplies high- and low-voltage DC power to support operation of the device 102 including circuitry within the scanner assembly 110.

The IVUS console 106 receives the echo data from the scanner assembly 110 by way of the PIM 104 and processes the data to reconstruct an image of the tissue structures in the medium surrounding the scanner assembly 110. Generally, the device 102 can be utilized within any suitable anatomy and/or body lumen of the patient. The processing system 106 outputs image data such that an image of the vessel or lumen 120, such as a cross-sectional IVUS image of the lumen 120, is displayed on the monitor 108. Lumen 120 may represent fluid filled or surrounded structures, both natural and man-made. Lumen 120 may be within a body of a patient. Lumen 120 may be a blood vessel, such as an artery or a vein of a patient's vascular system, including cardiac vasculature, peripheral vasculature, neural vasculature, renal vasculature, and/or or any other suitable lumen inside the body. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 102 may be used to examine man-made structures such as, but without limitation, heart valves, stents, shunts, filters and other devices.

In some embodiments, the IVUS device includes some features similar to traditional solid-state IVUS catheters, such as the EagleEye® catheter available from Volcano Corporation and those disclosed in U.S. Pat. No. 7,846,101 hereby incorporated by reference in its entirety. For example, the IVUS device 102 includes the scanner assembly 110 near a distal end of the device 102 and a transmission line bundle 112 extending along the longitudinal body of the device 102 within a flexible elongate member 121. It is understood that any suitable gauge wire can be used for the transmission line bundle 112. In an embodiment, the transmission line bundle 112 can include a four-conductor transmission line arrangement with, e.g., 41 American wire gauge (AWG) gauge wires. In an embodiment, the cable 112 can include a seven-conductor transmission line arrangement utilizing, e.g., 44 AWG gauge wires. In some embodiments, 43 AWG gauge wires can be used.

The transmission line bundle 112 terminates in a PIM connector 114 at a proximal end of the device 102. The PIM connector 114 electrically couples the transmission line bundle 112 to the PIM 104 and physically couples the IVUS device 102 to the PIM 104. In an embodiment, the IVUS device 102 further includes a guide wire exit port 116. Accordingly, in some instances the IVUS device is a rapid-exchange catheter. The guide wire exit port 116 allows a guide wire 118 to be inserted towards the distal end in order to direct the device 102 through the vessel 120.

In an embodiment, the image processing system 106 generates flow data by processing the echo signals from the IVUS device 102 into Doppler power or velocity information. The image processing system 106 may also generate B-mode data by applying envelope detection and logarithmic compression on the conditioned echo signals. The processing system 106 can further generate images in various views, such as 2D and/or 3D views, based on the flow data or the B-mode data. The processing system 106 can also perform various analyses and/or assessments. For example, the processing system 106 can apply virtual histology (VH) techniques, for example, to analyze or assess plaques within a vessel (e.g., the vessel 120). The images can be generated to display a reconstructed color-coded tissue map of plaque composition superimposed on a cross-sectional view of the vessel.

In an embodiment, the processing system 106 can apply a blood flow detection algorithm (e.g., ChromaFlo) to determine the movement of blood flow, for example, by acquiring image data of a target region (e.g., the vessel 120) repeatedly and determining the movement of the blood flow from the image data. The blood flow detection algorithm operates based on the principle that signals measured from vascular tissue are relatively static from acquisition to acquisition, whereas signals measured from blood flow vary at a characteristic rate corresponding to the flow rate. As such, the blood flow detection algorithm may determine movements of blood flow based on variations in signals measured from the target region between repeated acquisitions. To acquire the image data repeatedly, the processing system 106 may control to the device 102 to transmit repeated pulses on the same aperture.

An ultrasound transducer array of ultrasound imaging device includes an array of acoustic elements configured to emit ultrasound energy and receive echoes corresponding to the emitted ultrasound energy. In some instances, the array may include any number of ultrasound transducer elements. For example, the array can include between 2 acoustic elements and 10000 acoustic elements, including values such as 2 acoustic elements, 4 acoustic elements, acoustic elements, 64 acoustic elements, 128 acoustic elements, 500 acoustic elements, 812 acoustic elements, 3000 acoustic elements, 9000 acoustic elements, and/or other values both larger and smaller. In some instances, the transducer elements of the array may be arranged in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5D array), or a two-dimensional (2D) array. The array of transducer elements (e.g., one or more rows, one or more columns, and/or one or more orientations) can be uniformly or independently controlled and activated. The array can be configured to obtain one-dimensional, two-dimensional, and/or three-dimensional images of patient anatomy.

The ultrasound transducer elements may comprise piezoelectric/piezoresistive elements, piezoelectric micromachined ultrasound transducer (PMUT) elements, capacitive micromachined ultrasound transducer (CMUT) elements, and/or any other suitable type of ultrasound transducer elements. The ultrasound transducer elements of the array are in communication with (e.g., electrically coupled to) electronic circuitry. For example, the electronic circuitry can include one or more transducer control logic dies. The electronic circuitry can include one or more integrated circuits (IC), such as application specific integrated circuits (ASICs). In some embodiments, one or more of the ICs can comprise a microbeamformer (μBF). In other embodiments, one or more of the ICs comprises a multiplexer circuit (MUX).

Figure 2:
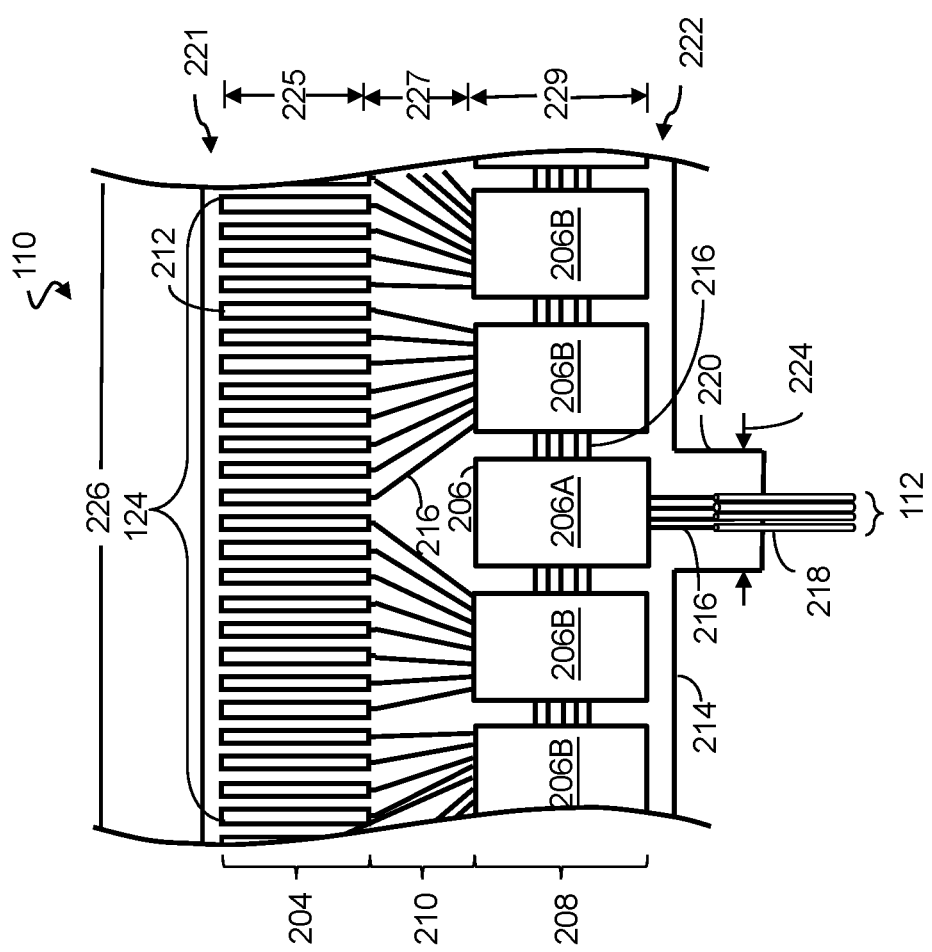
FIG. 2 is a diagrammatic view of the top of a scanner assembly in a flat configuration, according to aspects of the present disclosure.

FIG. 2 is a diagrammatic top view of a portion of a scanner assembly or scanner body 110 formed on a flexible substrate 214, in accordance with to aspects of the present disclosure. The scanner assembly or scanner body 110 includes a transducer array 124 formed in a transducer region 204 and transducer control logic dies 206 (including dies 206A and 206B) formed in a control region 208, with a transition region 210 disposed therebetween. In some embodiments, the scanner assembly or scanner body 110 is substantially rectangular in form when in a flat, unrolled state.

The transducer control logic dies 206 are mounted on the flexible substrate 214 into which the transducers 212 have been previously integrated. The flexible substrate 214 is shown in a flat configuration in FIG. 2. Though six control logic dies 206 are shown in FIG. 2, any number of control logic dies 206 may be used. For example, one, two, three, four, five, six, seven, eight, nine, ten, or more control logic dies 206 may be used.

The flexible substrate 214, on which the transducer control logic dies 206 and the transducers 212 are mounted, provides structural support and interconnects for electrical coupling. The flexible substrate 214 may be constructed to include a film layer of a flexible polyimide material such as KAPTON™ (trademark of DuPont). Other suitable materials include polyester films, polyimide films, polyethylene napthalate films, or polyetherimide films, liquid crystal polymer, other flexible printed semiconductor substrates as well as products such as Upilex® (registered trademark of Ube Industries) and TEFLON® (registered trademark of E.I. du Pont). In the flat configuration illustrated in FIG. 2, the flexible substrate 214 has a generally rectangular shape. As shown and described herein, the flexible substrate 214 is configured to be wrapped around a support member 230 (FIG. 3) in some instances. Therefore, the thickness and flexibility of the film layer of the flexible substrate 214 is generally related to the degree of curvature in the final assembled flexible assembly 110. In some embodiments, the film layer is between 5 μm and 100 μm, with some particular embodiments being between 5 μm and 25.1 μm, e.g., 6 μm.

The transducer control logic dies 206 is a non-limiting example of a control circuit. The transducer region 204 is disposed at a distal portion 221 of the flexible substrate 214. The control region 208 is disposed at a proximal portion 222 of the flexible substrate 214. The transition region 210 is disposed between the control region 208 and the transducer region 204. Dimensions of the transducer region 204, the control region 208, and the transition region 210 (e.g., lengths 225, 227, 229) can vary in different embodiments. In some embodiments, the lengths 225, 227, 229 can be substantially similar or, the length 227 of the transition region 210 may be less than lengths 225 and 229, the length 227 of the transition region 210 can be greater than lengths 225, 229 of the transducer region and controller region, respectively.

The control logic dies 206 are not necessarily homogenous. In some embodiments, a single controller is designated a master control logic die 206A and contains the communication interface for transmission line bundle or cable 112 which may serve as electrical conductor(s), e.g., electrical conductor(s) 218, between a processing system, e.g., processing system 106, and the flexible scanner assembly 110. Accordingly, the master control circuit may include control logic that decodes control signals received over the cable or transmission line bundle 112, transmits control responses over the cable 142, amplifies echo signals, and/or transmits the echo signals over the cable or transmission line bundle 112. The remaining controllers are slave controllers 206B. The slave controllers 206B may include control logic that drives a transducer 212 to emit an ultrasonic signal and selects a transducer 212 to receive an echo. In the depicted embodiment, the master controller 206A does not directly control any transducers 212. In other embodiments, the master controller 206A drives the same number of transducers 212 as the slave controllers 206B or drives a reduced set of transducers 212 as compared to the slave controllers 206B. In an exemplary embodiment, a single master controller 206A and eight slave controllers 206B are provided with eight transducers assigned to each slave controller 206B.

To electrically interconnect the control logic dies 206 and the transducers 212, in an embodiment, the flexible substrate 214 includes conductive traces 216 formed in the film layer that carry signals between the control logic dies 206 and the transducers 212. In particular, the conductive traces 216 providing communication between the control logic dies 206 and the transducers 212 extend along the flexible substrate 214 within the transition region 210. In some instances, the conductive traces 216 can also facilitate electrical communication between the master controller 206A and the slave controllers 206B. The conductive traces 216 can also provide a set of conductive pads that contact the conductors 218 of cable 142 when the conductors 218 of the cable 142 are mechanically and electrically coupled to the flexible substrate 214. Suitable materials for the conductive traces 216 include copper, gold, aluminum, silver, tantalum, nickel, and tin, and may be deposited on the flexible substrate 214 by processes such as sputtering, plating, and etching. In an embodiment, the flexible substrate 214 includes a chromium adhesion layer. The width and thickness of the conductive traces 216 are selected to provide proper conductivity and resilience when the flexible substrate 214 is rolled. In that regard, an exemplary range for the thickness of a conductive trace 216 and/or conductive pad is between 1-5 μm. For example, in an embodiment, 5 μm conductive traces 216 are separated by 5 μm of space. The width of a conductive trace 216 on the flexible substrate may be further determined by the width of the conductor 218 to be coupled to the trace/pad. The transmission line bundle or cable 112 can include a plurality of conductors, including one, two, three, four, five, six, seven, or more conductors 218.

The flexible substrate 214 can include a conductor interface 220 in some embodiments. In some cases, the conductor interface 220 may be referred to as an attachment portion, connection portion, tail, tail portion, weld leg, flex tail, etc. The conductor interface 220 (also referred to as an attachment portion 220) can be a location of the flexible substrate 214 where the conductors 218 of the cable 142 are coupled to the flexible substrate 214. For example, the bare conductors of the cable 142 are electrically coupled to the flexible substrate 214 at the conductor interface 220. The conductor interface 220 can be a tab extending from the main body of flexible substrate 214. In that regard, the main body of the flexible substrate 214 can refer collectively to the transducer region 204, controller region 208, and the transition region 210. In the illustrated embodiment, the conductor interface 220 extends from the proximal portion 222 of the flexible substrate 214. In other embodiments, the conductor interface 220 is positioned at other parts of the flexible substrate 214, such as the distal portion 221, or the flexible substrate 214 may lack the conductor interface 220. A value of a dimension of the tab or conductor interface 220, such as a width 224, can be less than the value of a dimension of the main body of the flexible substrate 214, such as a width 226. In some embodiments, the substrate forming the conductor interface 220 is made of the same material(s) and/or is similarly flexible as the flexible substrate 214. In other embodiments, the conductor interface 220 is made of different materials and/or is comparatively more rigid than the flexible substrate 214. For example, the conductor interface 220 can be made of a plastic, thermoplastic, polymer, hard polymer, etc., including polyoxymethylene (e.g., DELRIN®), polyether ether ketone (PEEK), nylon, Liquid Crystal Polymer (LCP), and/or other suitable materials.

Figure 3:
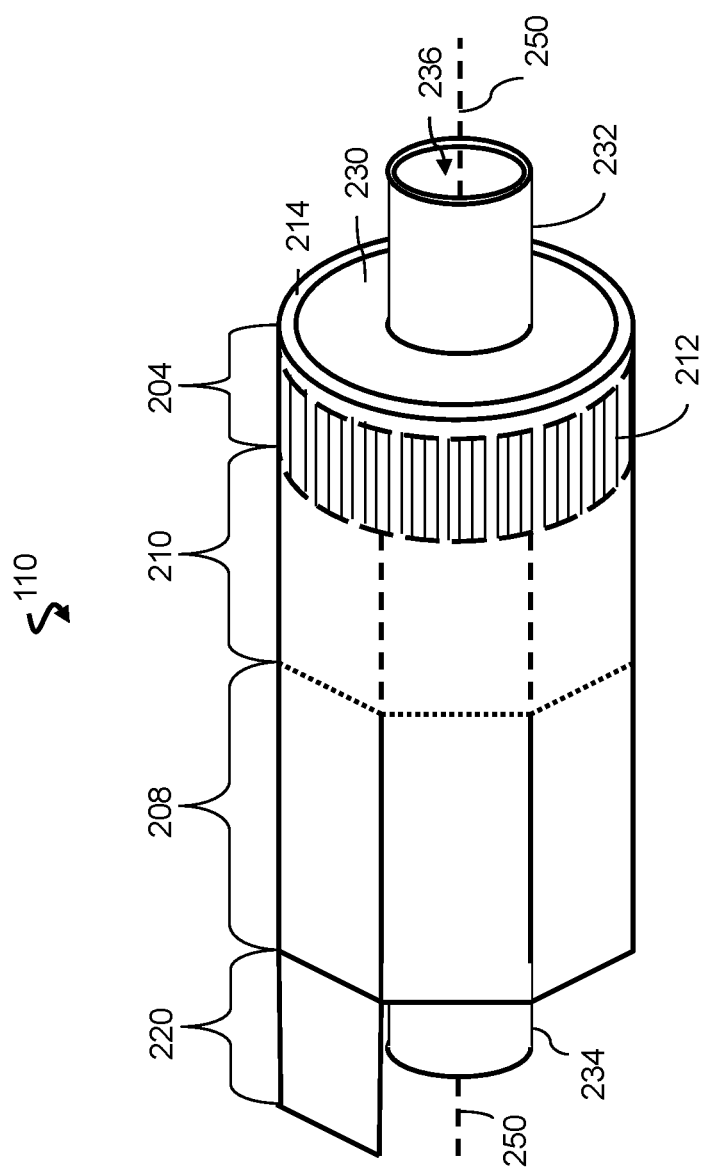
FIG. 3 is a diagrammatic perspective view of the scanner assembly shown in FIG. 2 in a rolled configuration around a support member, according to aspects of the present disclosure.

FIG. 3 illustrates a perspective view of the ultrasound scanner assembly 110 in a rolled configuration, in accordance with aspects of the present disclosure. In some instances, the assembly 110 is transitioned from a flat configuration (as shown for example in FIG. 2) to a rolled or more cylindrical configuration (as shown for example in FIG. 3). For example, in some embodiments, techniques are utilized as disclosed in one or more of U.S. Pat. No. 6,776,763, titled "ULTRASONIC TRANSDUCER ARRAY AND METHOD OF MANUFACTURING THE SAME" and U.S. Pat. No. 7,226,417, titled "HIGH RESOLUTION INTRAVASCULAR ULTRASOUND SENSING ASSEMBLY HAVING A FLEXIBLE SUBSTRATE," each of which is hereby incorporated by reference in its entirety.

In some embodiments, the transducer elements 212 and/or the controllers 206 can be positioned in in an annular configuration, such as a circular configuration or in a polygon configuration, around a longitudinal axis 250 of a support member 230. It will be understood that the longitudinal axis 250 of the support member 230 may also be referred to as the longitudinal axis of the scanner assembly 110, the flexible elongate member 121, and/or the intraluminal imaging device 102. For example, a cross-sectional profile of the imaging assembly 110 at the transducer elements 212 and/or the controllers 206 can be a circle or a polygon. Any suitable annular polygon shape can be implemented, such as a based on the number of controllers/transducers, flexibility of the controllers/transducers, etc., including a pentagon, hexagon, heptagon, octagon, nonagon, decagon, etc. In some examples, the plurality of transducer controllers 206 may be used for controlling the plurality of ultrasound transducer elements 212 to obtain imaging data associated with the vessel 120.

The support member 230 can be referenced as a unibody in some instances. The support member 230 can be composed of a metallic material, such as stainless steel, or non-metallic material, such as a plastic or polymer as described in U.S. Provisional Application No. 61/985,220, "Pre-Doped Solid Substrate for Intravascular Devices," filed Apr. 28, 2014, ('220 Application) the entirety of which is hereby incorporated by reference herein. The support member 230 can be a ferrule having a distal flange or portion 232 and a proximal flange or portion 234. The support member 230 can be tubular in shape and define a lumen 236 extending longitudinally therethrough. The lumen 236 can be sized and shaped to receive the guide wire 118. The support member 230 can be manufactured using any suitable process. For example, the support member 230 can be machined and/or electrochemically machined or laser milled, such as by removing material from a blank to shape the support member 230, or molded, such as by an injection molding process.

Figure 4:
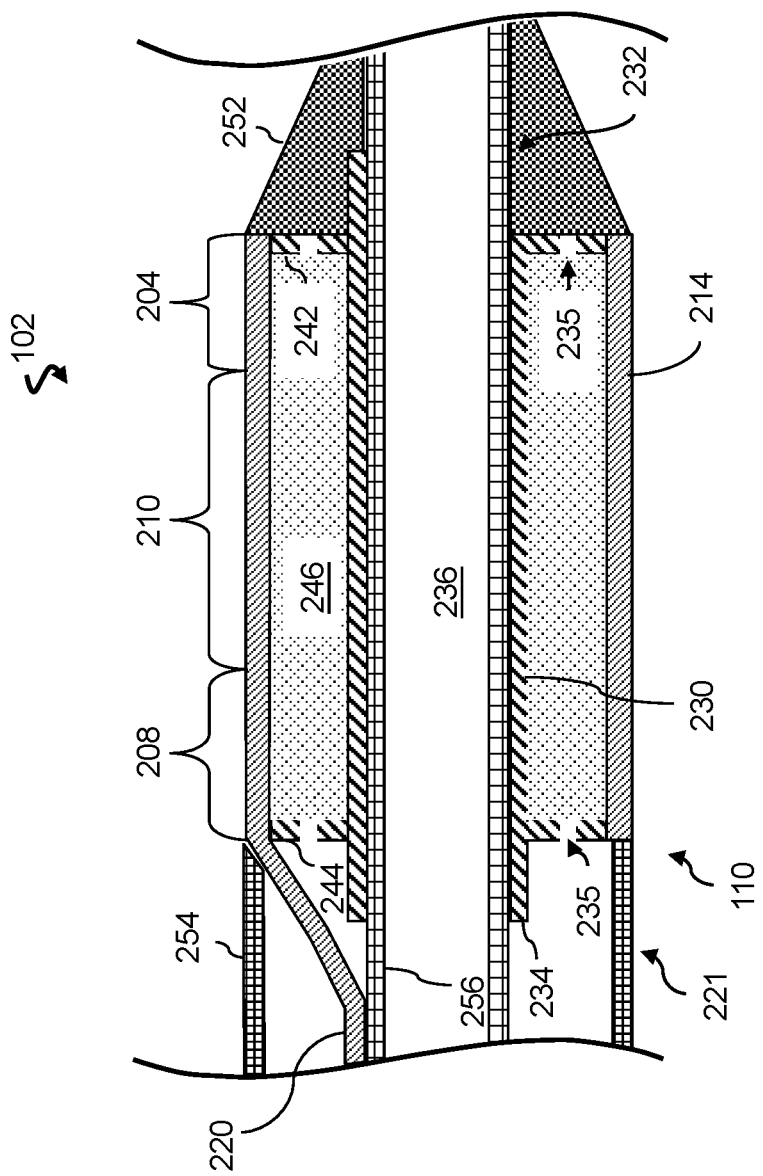
FIG. 4 is a diagrammatic cross-sectional side view of a scanner assembly in a rolled configuration around a support member, according to aspects of the present disclosure.

FIG. 4 shows a diagrammatic cross-sectional side view of a distal portion of the intraluminal imaging device 102, including the flexible substrate 214 and the support member 230, in accordance with aspects of the present disclosure. The support member 230 can be referenced as a unibody in some instances. The support member 230 can be composed of a metallic material, such as stainless steel, or non-metallic material, such as a plastic or polymer as described in U.S. Provisional Application No. 61/985,220, "Pre-Doped Solid Substrate for Intravascular Devices," filed Apr. 28, 2014, the entirety of which is hereby incorporated by reference herein. The support member 230 can be ferrule having a distal portion or flange 232 and a proximal or flange portion 234. The support member 230 can define a lumen 236 extending along the longitudinal axis. The lumen 236 is in communication with the entry/exit port 116 and is sized and shaped to receive the guide wire 118 (as shown for example in FIG. 1). The support member 230 can be manufactured according to any suitable process. For example, the support member 230 can be machined and/or electrochemically machined or laser milled, such as by removing material from a blank to shape the support member 230, or molded, such as by an injection molding process. In some embodiments, the support member 230 may be integrally formed as a unitary or unibody structure, while in other embodiments the support member 230 may be formed of different components, such as a ferrule and stands 242, 244, that are fixedly coupled to one another. In some cases, the support member 230 and/or one or more components thereof may be completely integrated with an inner member or guide wire member 256. In some cases, the inner member 256 and the support member 230 may be joined as one, e.g., in the case of a polymer support member.

Stands 242, 244 that extend vertically are provided at the distal and proximal portions 232, 234, respectively, of the support member 230. The stands 242, 244 elevate and support the distal and proximal portions of the flexible substrate 214. In that regard, portions of the flexible substrate 214, such as the transducer portion 204 (or transducer region 204), can be spaced from a central body portion of the support member 230 extending between the stands 242, 244. The stands 242, 244 can have the same outer diameter or different outer diameters. For example, the distal stand 242 can have a larger or smaller outer diameter than the proximal stand 244 and can also have special features for rotational alignment as well as control chip placement and connection. To improve acoustic performance, any cavities between the flexible substrate 214 and the surface of the support member 230 are filled with a backing material 246. The liquid backing material 246 can be introduced between the flexible substrate 214 and the support member 230 via passageways 235 in the stands 242, 244. In some embodiments, suction can be applied via the passageways 235 of one of the stands 242, 244, while the liquid backing material 246 is fed between the flexible substrate 214 and the support member 230 via the passageways 235 of the other of the stands 242, 244. The backing material can be cured to allow it to solidify and set. In various embodiments, the support member 230 includes more than two stands 242, 244, only one of the stands 242, 244, or neither of the stands. In that regard the support member 230 can have an increased diameter distal portion 232 and/or increased diameter proximal portion 234 that is sized and shaped to elevate and support the distal and/or proximal portions of the flexible substrate 214.

The support member 230 can be substantially cylindrical in some embodiments. Other shapes of the support member 230 are also contemplated including geometrical, non-geometrical, symmetrical, non-symmetrical, cross-sectional profiles. As the term is used herein, the shape of the support member 230 may reference a cross-sectional profile of the support member 230. Different portions the support member 230 can be variously shaped in other embodiments. For example, the proximal portion 234 can have a larger outer diameter than the outer diameters of the distal portion 232 or a central portion extending between the distal and proximal portions 232, 234. In some embodiments, an inner diameter of the support member 230 (e.g., the diameter of the lumen 236) can correspondingly increase or decrease as the outer diameter changes. In other embodiments, the inner diameter of the support member 230 remains the same despite variations in the outer diameter.

An inner member 256 and a proximal outer member 254 are coupled to the proximal portion 234 of the support member 230. The inner member or guide wire member 256 and/or the proximal outer member 254 can comprise a flexible elongate member. The inner member 256 can be received within a proximal flange 234, or may terminate within the support member 230, or may extend entirely through the support member 230 and project out through the distal portion or flange 232. The proximal outer member 254 abuts and is in contact with the flexible substrate 214. A distal member 252 is coupled to the distal portion 232 of the support member 230. For example, the distal member 252 is positioned around the distal flange 232. The distal member 252 can abut and be in contact with the flexible substrate 214 and the stand 242. The distal member 252 can be the distal-most component of the intraluminal imaging device 102.

One or more adhesives can be disposed between various components at the distal portion of the intraluminal imaging device 102. For example, one or more of the flexible substrate 214, the support member 230, the distal member 252, the inner member 256, and/or the proximal outer member 254 can be coupled to one another via an adhesive.

The flexible substrate 214 includes a conductor interface 220, which may also be referred to as an attachment portion. The attachment portion 220 may have the form of a tail or leg extending proximally of a scanner portion of the flexible interface 214. The attachment portion extends within an annular space created by the inner member 256 and the outer member 254, and is coupled to the inner member 256. In some embodiments, the attachment portion 220 is adhered, welded, tacked, or otherwise connected to the inner member 256 at one or more attachment locations. As described below, in some embodiments, the attachment portion 220 comprises a plurality of curves. A curved segment of the attachment portion 220 can be at least partially wrapped around the inner member 256. In an exemplary embodiment, at least a portion of the curved segment is not adhered or affixed to the inner member 256 so that the curved segment of the attachment portion 220 is allowed to move and flex relative to the inner member 256 while the device 102 is being assembled or navigated through the vasculature.

Figure 5:
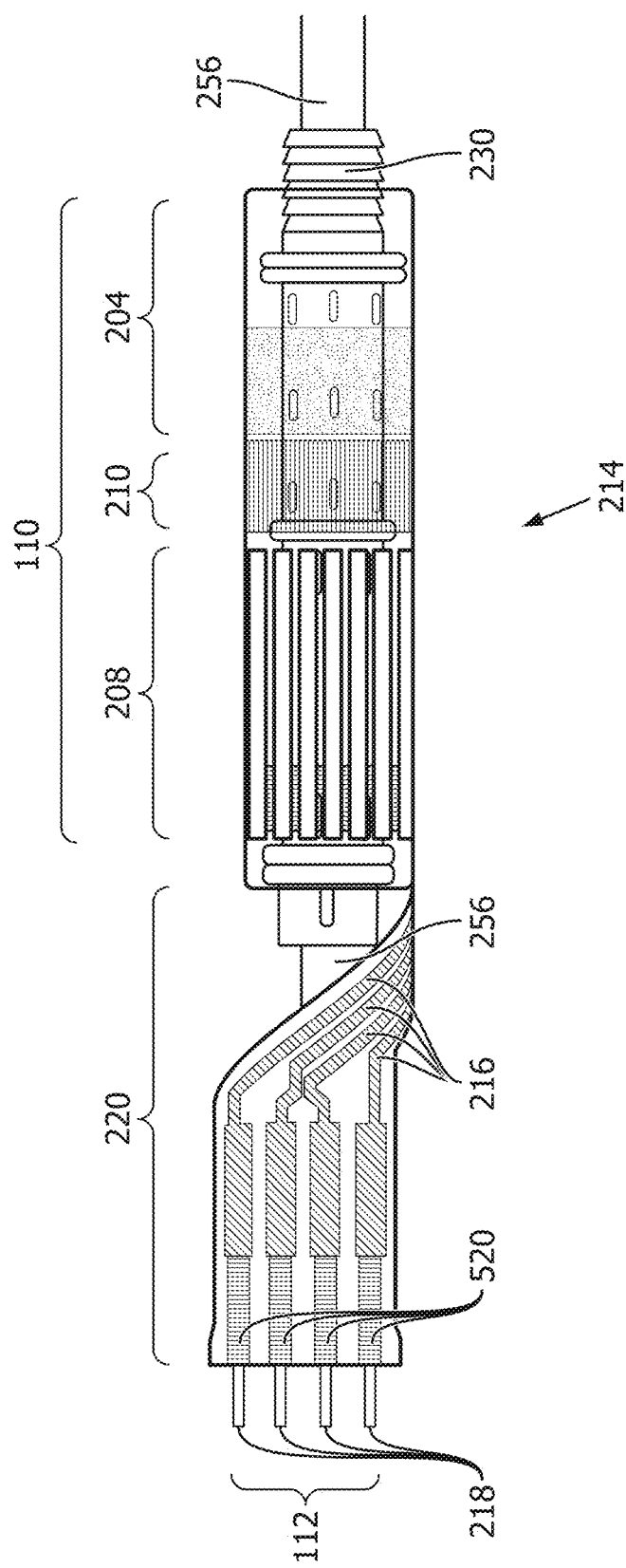
FIG. 5 is an elevation view of an ultrasound imaging assembly with a distal portion of a flexible substrate in a rolled configuration around a support member, according to aspects of the present disclosure.

FIG. 5 is an elevation view of an ultrasound imaging assembly 110 with a distal portion of a flexible substrate 214 in a rolled configuration around the support member 230, in accordance with aspects of the present disclosure. The flexible scanner assembly 110 has been wrapped around the support member 230 (e.g., a ferrule, metal tube, unibody, or other suitable structure) such that the control region 208, transition region 210, and transducer region 204 have taken a cylindrical shape around the support member 230. In some instances, the control region 208, transition region 210, and transducer region 204 can be referenced as a distal portion or scanner body portion of the flexible substrate 214. Also visible is the conductor interface or attachment portion 220, which includes conductive traces 216 and conductive weld pads or solder pads 520 to which may be attached the conductors 218 that form the cable 112. In some instances, the conductor interface 220 can be referenced as a proximal portion of the flexible substrate 214. The conductive traces 216 in the conductor interface or attachment portion 220 establish electrical communication between the weld pads 520 and the controller region 208. In order to prevent heat damage to the scanner assembly 110 when conductors 218 are welded or soldered to the conductive pads 520, the conductor interface 220 projects away from the control region 208 of the scanner assembly 110 for some distance.

The cable 112 includes a plurality of conductors 218 extending along a length of the flexible elongate member (e.g., flexible elongate member 121 as shown for example in FIG. 1). A proximal region of the attachment portion comprises the plurality of electrical contacts or weld pads 520 that are coupled to the plurality of conductive traces 216. The plurality of conductors 218 are electrically connected to the plurality of conductive traces 216 via the plurality of electrical contacts or weld pads or solder pads 520. The cable 112 formed by the plurality of electrical conductors 218 extends within an annular space between the inner member 256 and the outer member (e.g., outer member 254 as shown for example in FIG. 4). The proximal region of the attachment portion comprises a generally rectangular shape and is aligned with the longitudinal axis of the flexible elongate member. The scanner body portion or scanner assembly 110 of the device (e.g., device 102 as shown for example in FIG. 1) is positioned around the rigid tubular member or support member 230. The attachment portion 220 extends proximally of the rigid tubular member, the one or more transducer elements of the transducer region 204, and the one or more control circuits of the control region 208.

Figure 6:
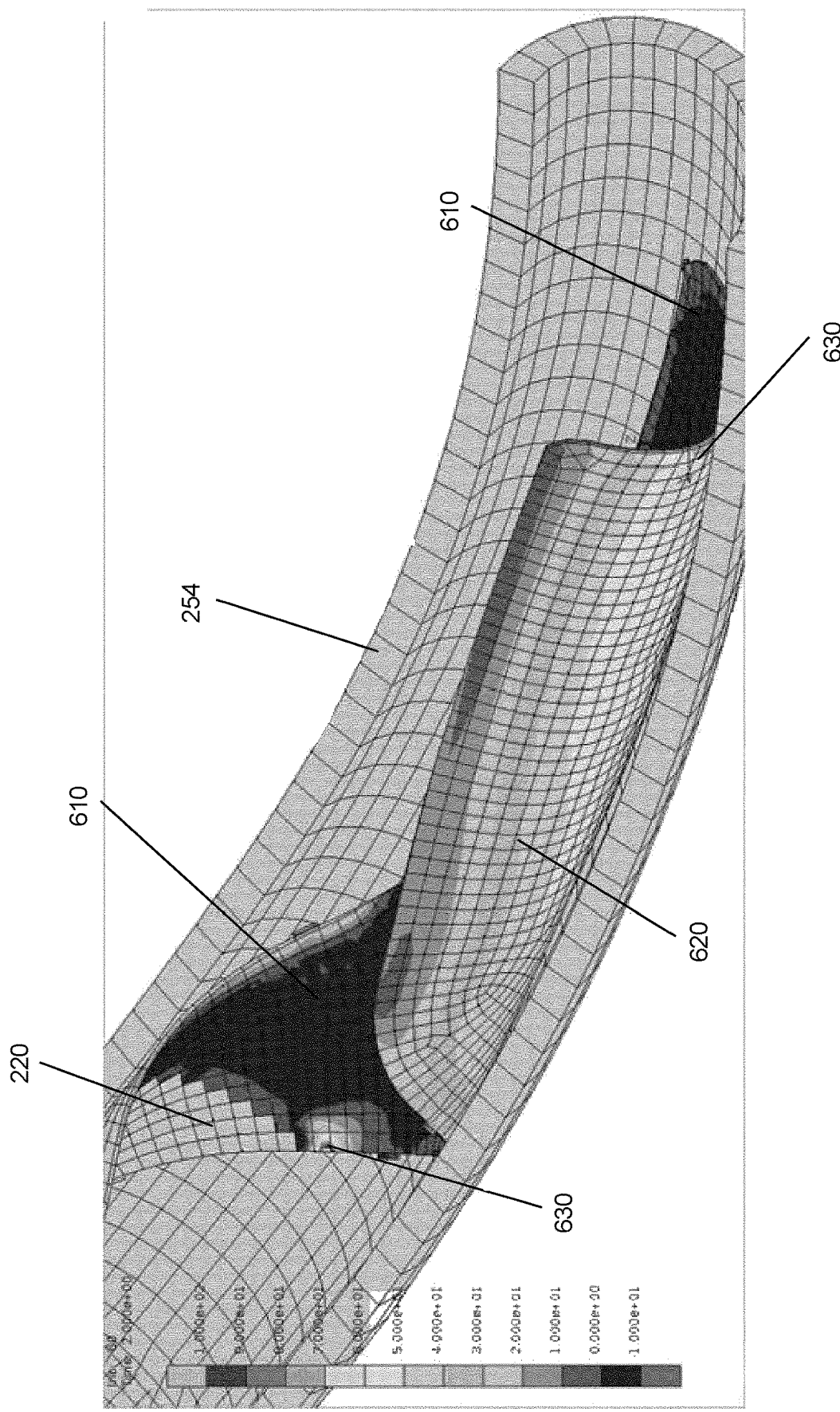
FIG. 6 is a diagrammatic view of a flex circuit attachment portion rolled around an inner member and positioned within an outer member, in accordance with at aspects of the present disclosure.

FIG. 6 is a diagrammatic view of a flex circuit attachment portion 220 rolled around an inner member (not pictured) and positioned within an outer member 254, in accordance with at aspects of the present disclosure. As the outer member 254 is bent (e.g., while navigating tortuous pathways of a human vascular system), the attachment portion 220 experiences areas of low stress 610, areas of moderate stress 620, and areas of high stress 630.

Figure 7:
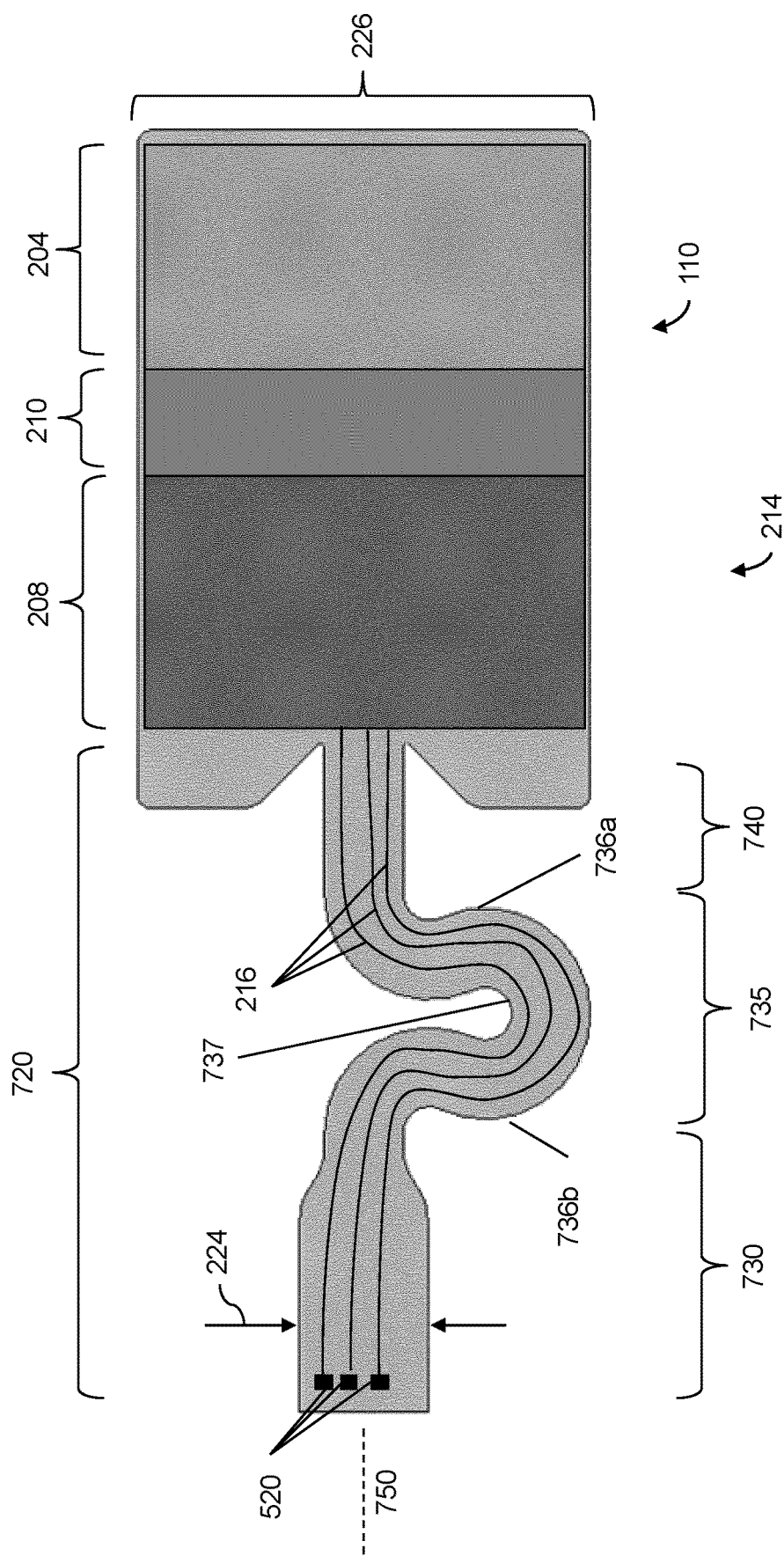
FIG. 7 is a diagrammatic view of a flexible substrate in an unrolled state, in accordance with at least one embodiment of the present disclosure.

FIG. 7 is a diagrammatic view of a flexible substrate 214 in an unrolled or flat state, in accordance with at least one embodiment of the present disclosure. Visible are the transducer region 204, transition region 210, and control region 208 of the scanner body portion 110, and the attachment portion or weld leg 720 extending proximally from the scanner body portion 110, and including a plurality of conductive traces 216 that connect a plurality of weld pads 520 to one or more control circuits of the control region 208. The attachment portion 720 is substantially rectangular and substantially aligned with the longitudinal axis 750 of the flexible elongate member (e.g., the longitudinal axis of the inner member 256 as shown for example in FIG. 5), and includes a proximal portion 730, where the weld pads are located, and an intermediate portion 735, and a distal portion 740. The intermediate portion 735 defines a curved path which, in the example shown in FIG. 7, comprises a first curve 736a in a first direction and a second curve 736b in a second (e.g., opposite) direction, thus forming a bend 737. A greater or lesser number of curves may be provided instead or in addition. This curved path may for example be described as a C-shape, D-shape, S-shape, horseshoe shape, a serpentine shape, a sinusoidal shape, a zig-zag shape, a braided shape, or a strain-relief shape. The first and second curves 736a, 736b may each for example be oriented at angles of 60-90 degrees relative to the longitudinal axis 750.

In some embodiments, the conductive traces 216 follow the curved path of the attachment portion 720. In some embodiments, the width of the proximal region 730 of the attachment portion 720 is greater than a width of the intermediate region 735 and distal region 740. In some embodiments, the width 226 of the scanner body portion 110 is greater than the width 224 of the attachment portion 720.

Figure 8:
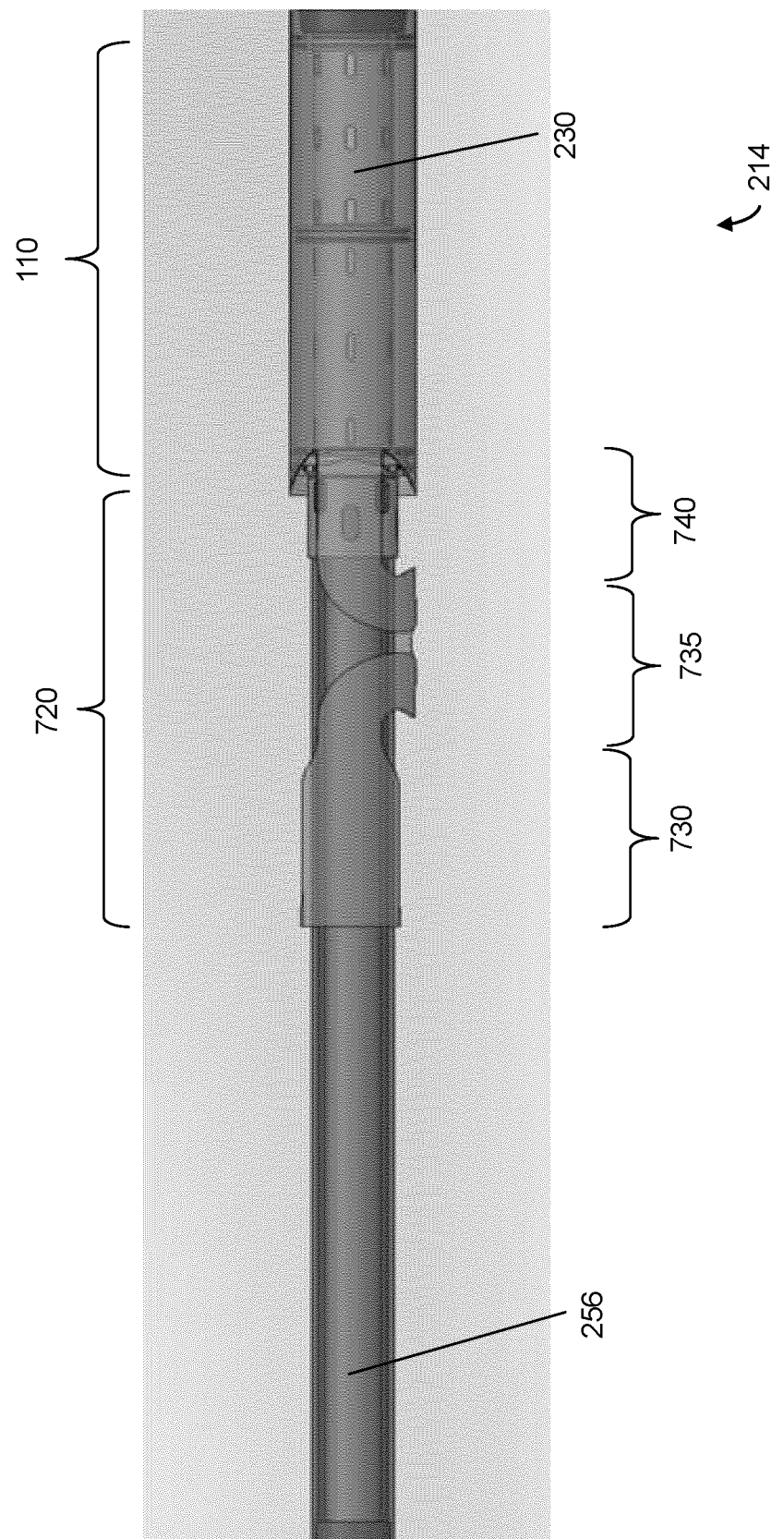
FIG. 8 is an elevation view of the flex circuit wrapped cylindrically around a support member and an inner member of the flexible elongate member, in accordance with at least one embodiment of the present disclosure.

FIG. 8 is a diagrammatic view of the flex circuit 214 of FIG. 7 wrapped cylindrically around a ferule, unibody, or support member 230 and an inner member 256 of the flexible elongate member, in accordance with at least one embodiment of the present disclosure. In the example shown in FIG. 8, the proximal region 730 of the attachment portion 720 is attached to the inner member (e.g., with adhesive, caulk, or heat shrink tubing), while the distal region 740 of the attachment portion 720 is attached to the scanner body portion 110, which is attached to the support member 230. However, in some embodiments, at least the intermediate region 735 of the attachment portion 720 is detached from the inner member 256, and capable of flexing, stretching, rotating, or translating with respect to the inner member 256, e.g., when the inner member 256 is bent. Such bending may occur for example as the flexible elongate member is navigated through the tortuous pathways of a human vascular system, or other anatomical system. In some embodiments, an outer tubular member, such as the outer member 254 shown in FIG. 4, is placed around the attachment portion 720 and abuts a proximal end of the scanner body portion 110. Accordingly, the attachment portion 720 is positioned within an annular space defined by the inner member 256 and the outer member 254.

Figure 9:
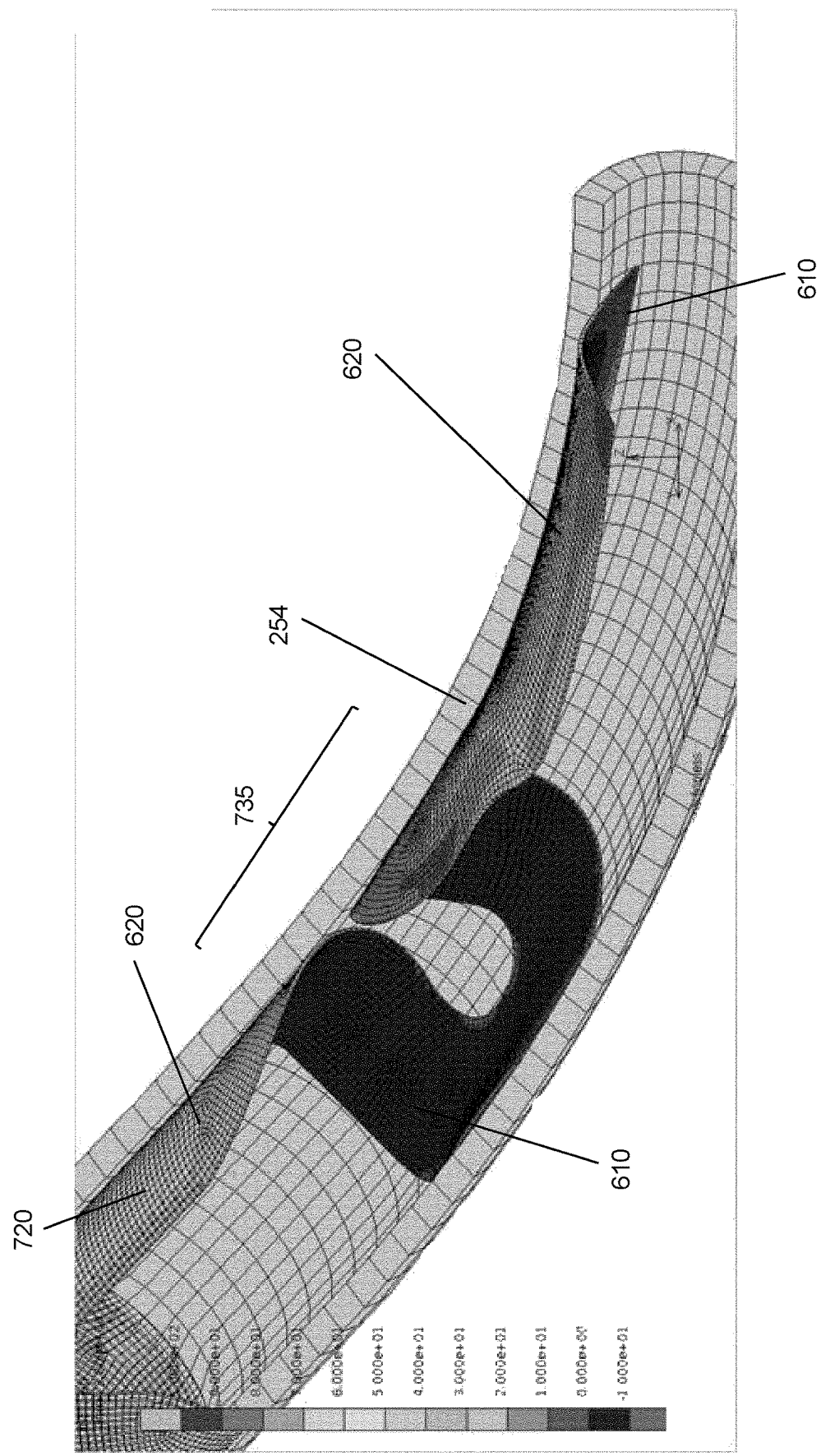
FIG. 9 is a is a diagrammatic view of a curved flex circuit attachment portion rolled around the inner member and positioned within an outer member, in accordance with at least one embodiment of the present disclosure.

FIG. 9 is a is a diagrammatic view of a curved flex circuit attachment portion 720 rolled around the inner member 256 (not pictured) and positioned within an outer member 254, in accordance with at least one embodiment of the present disclosure. As the outer member 254 is bent to the same degree as shown in FIG. 6 (e.g., while navigating tortuous pathways of a human vascular system), the attachment portion 720 experiences areas of low stress 610, and areas of moderate stress 620. In this example, unlike the attachment portion 220 shown in the example of FIG. 6, the attachment portion 720 of FIG. 9 shows no regions of high stress. This is possible because the curved (e.g., horseshoe-curved) shape of the intermediate region 735 of the attachment portion 720 makes it possible for the intermediate region 735 to bend, flex, rotate, and translate with respect to the inner member 256 (not pictured).

Figure 10:
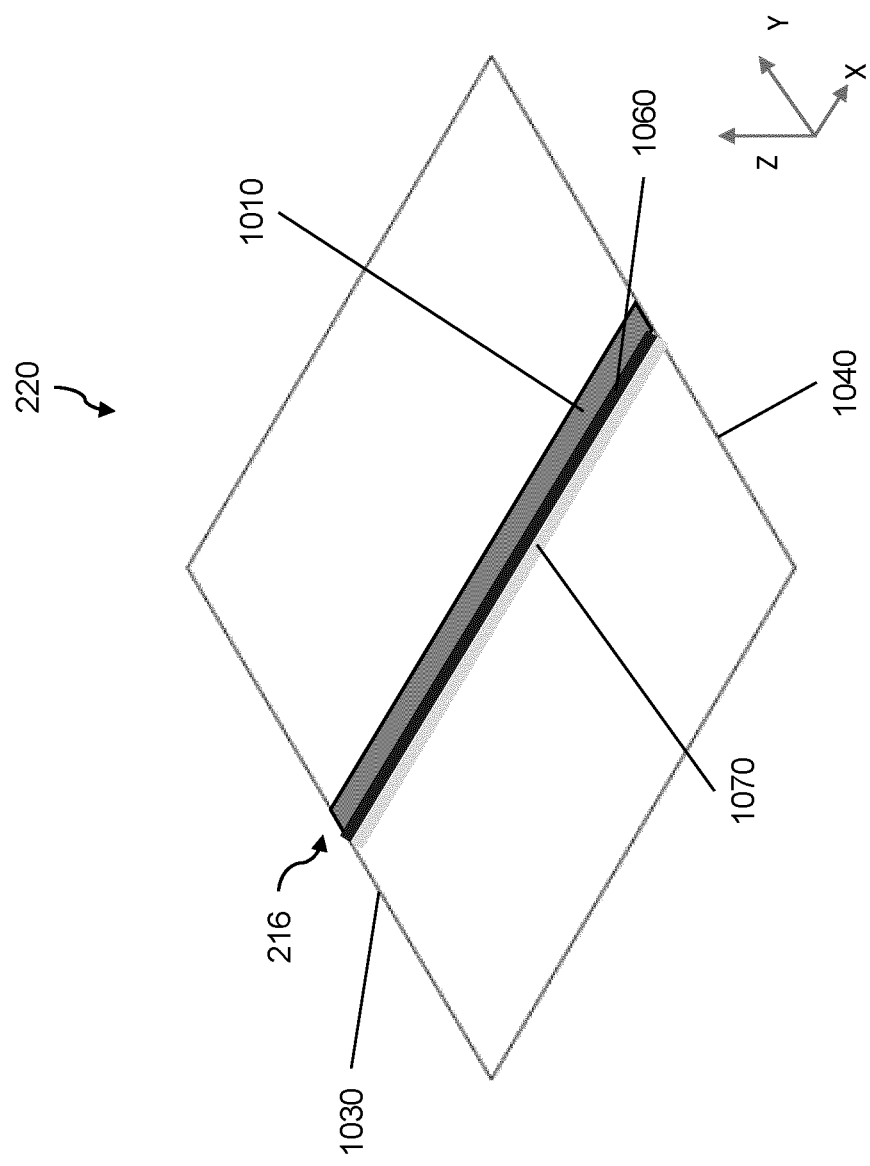
FIG. 10 is a schematic representation of an electrical trace of the flex circuit attachment portion, in accordance with at least one embodiment of the present disclosure.

FIG. 10 is a schematic representation of an electrical trace 216 of the flex circuit attachment portion 220 or attachment portion 720, in accordance with at least one embodiment of the present disclosure. A dark color 1010 indicates regions of the electrical trace 216 which are subject to fracture when the attachment portion 220 or 720 is bent around a Y-axis after having been rolled around an X-axis (e.g., rolled around the inner member 256 as shown for example in FIG. 5, and bent within the outer member 254 as shown for example in FIG. 6). Because the electrical trace 216 is of uniform width, it is capable of fracturing across its entire width, thus breaking electrical continuity between a proximal side 1030 of the attachment portion 220 and a distal side 1040 of the attachment portion 220. Such a break in electrical continuity may result in a non-functional device. Furthermore, because the electrical trace 216 is straight, it does not include any strain relief features, and is therefore equally capable of fracturing at any point along its length. Therefore, the dark color 1010 covers the entirety of the electrical trace 216.

The electrical trace may for example be a 1-micron to 5-micron thick layer 1060 of copper, nickel, or gold, or combinations thereof, deposited on top of a 200 nanometer to 600 nanometer thick adhesion layer 1070 such as titanium or tungsten, or combinations thereof.

Figure 11:
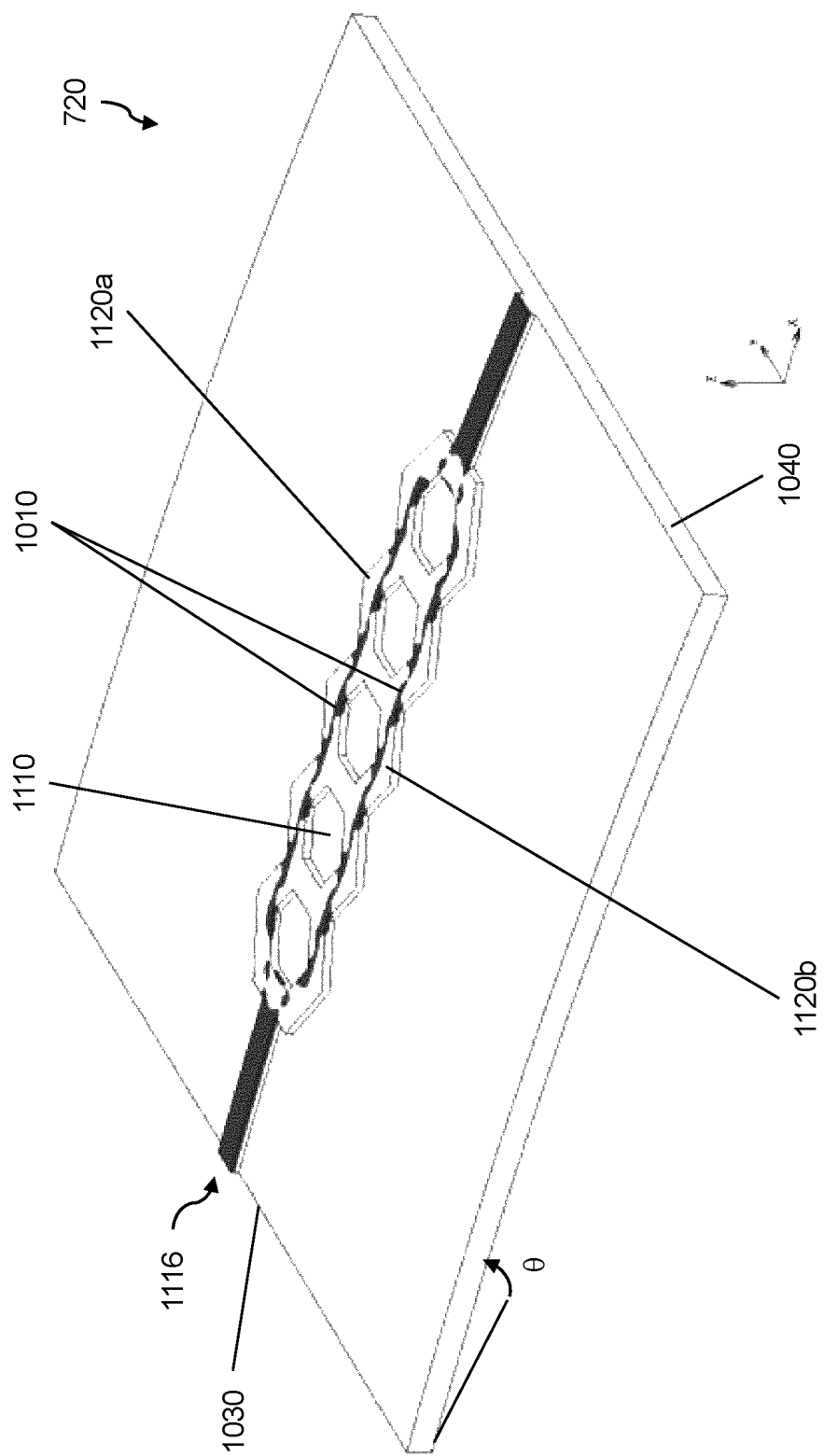
FIG. 11 is a schematic representation of a hex-pattern electrical trace of a flex circuit attachment portion, in accordance with at least one embodiment of the present disclosure.

FIG. 11 is a schematic representation of a hex-pattern electrical trace 1116 of a flex circuit attachment portion 720, in accordance with at least one embodiment of the present disclosure. The electrical trace 1116 includes a plurality of openings 1110 (e.g., hexagonal openings) that define two different, interconnected pathways 1120a and 1120b (e.g., hex-shaped or zig-zag pathways). A dark color 1010 indicates regions of the electrical trace 1116 which are subject to fracture when the attachment portion 720 is bent (e.g., to an angle θ around a Y-axis as shown). Because the electrical trace 216 is of non-uniform width and includes two separate interconnected pathways 1120a and 1120b, it is capable of fracturing across its entire width only in the regions where it is straight. In other regions, the openings 1110 and interconnected alternating zig-zag pathways 1120a and 1120b are capable of acting as strain relief features, such that when the attachment portion 720 is rolled and bent, any fractures that occur are unlikely to cross the entire width of the electrical trace 1116. Thus, the dark color 1010 indicates a probability of fracture only in certain portions of each pathway, thus making it probable that a fracture in the electrical trace 1116 will not fully interrupt electrical continuity between the proximal side 1030 and distal side 1040 of the attachment portion 720. If electrical continuity can be maintained despite bending of the attachment portion 720, the electrical trace 1116 of FIG. 11 may more durable than the electrical trace 216 of FIG. 10 when faced with the same degree of bending.

Because it can be more robust, the electrical trace may in some cases comprise a conductive layer copper, nickel, or gold, or may comprise only an adhesion layer of metals such as titanium, tungsten, or combinations thereof. The metal mass of the trace 216 must be sufficient to carry any required electrical signals without overheating. However, within this constraint, because thin metal traces may be more flexible and/or stretchable than thick ones, it may be advantageous to minimize the mass, width, or thickness of the trace 216, in order to minimize the chance of fracture.

Figure 12:
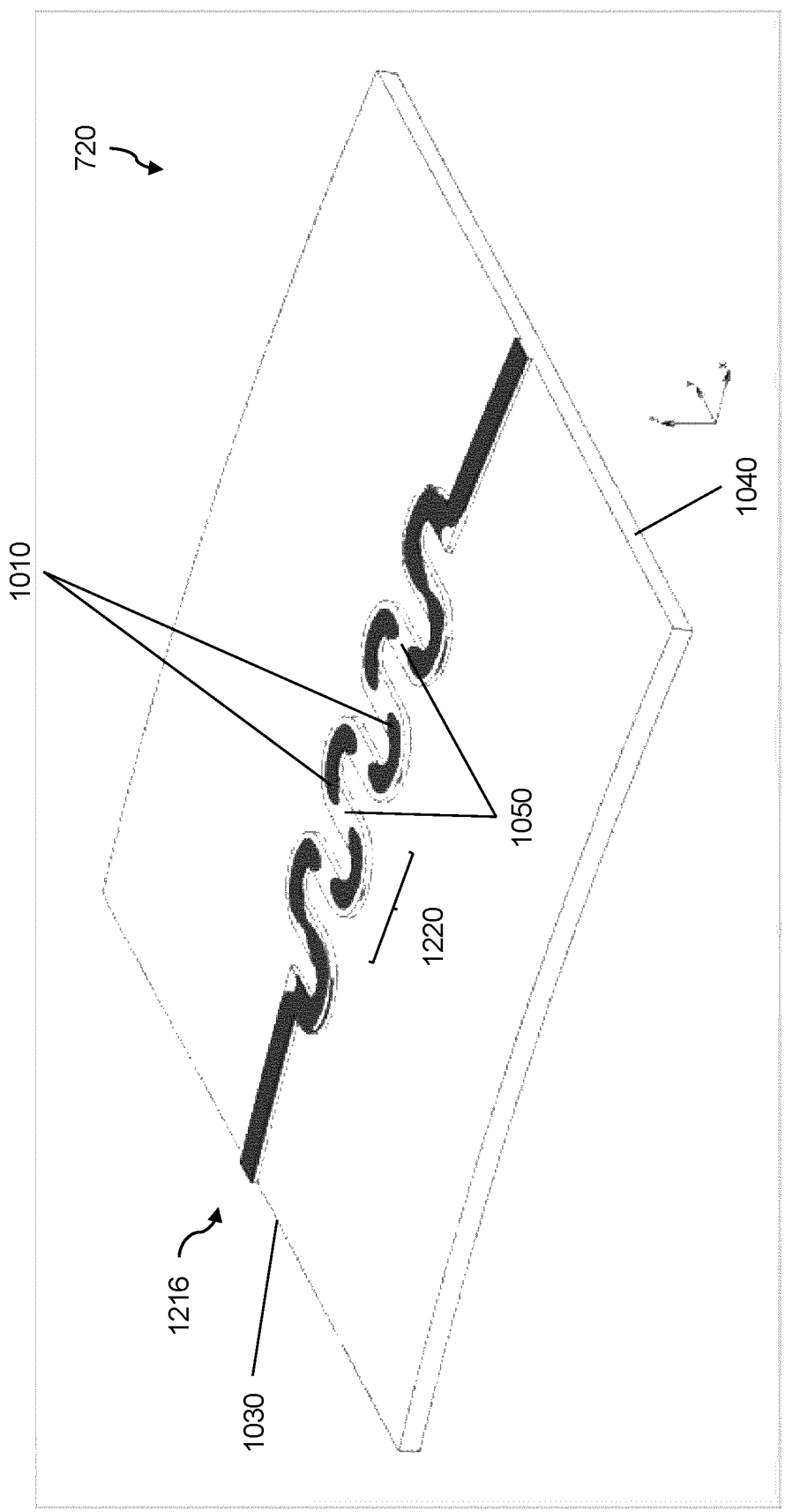
FIG. 12 is a schematic representation of a horseshoe-patterned or sinusoidal-patterned electrical trace of a flex circuit attachment portion, in accordance with at least one embodiment of the present disclosure.

FIG. 12 is a schematic representation of a repeating horseshoe-pattern or sinusoidal-pattern electrical trace 1216 of a flex circuit attachment portion 720, in accordance with at least one embodiment of the present disclosure. The electrical trace 1216 includes a plurality of 180-degree horseshoe bends 1220 that define a single pathway for the electrical trace 1216. A dark color 1010 indicates regions of the electrical trace 1216 which are subject to fracture when the attachment portion 720 is bent. Because the electrical trace 216 is of uniform width it is capable of fracturing across its entire width in certain regions. In other regions, the horseshoe bends 1220 are capable of acting as strain relief features, such that when the attachment portion 720 is rolled and bent, fracture is unlikely in some (uncolored) regions 1050 of the trace. Thus, the dark color 1010 indicates a probability of fracture only in certain portions of the pathway, thus making it less probable that a fracture in the electrical trace 1116 will fully interrupt electrical continuity between the proximal side 1030 and distal side 1040 of the connection region 720.

Figure 13:
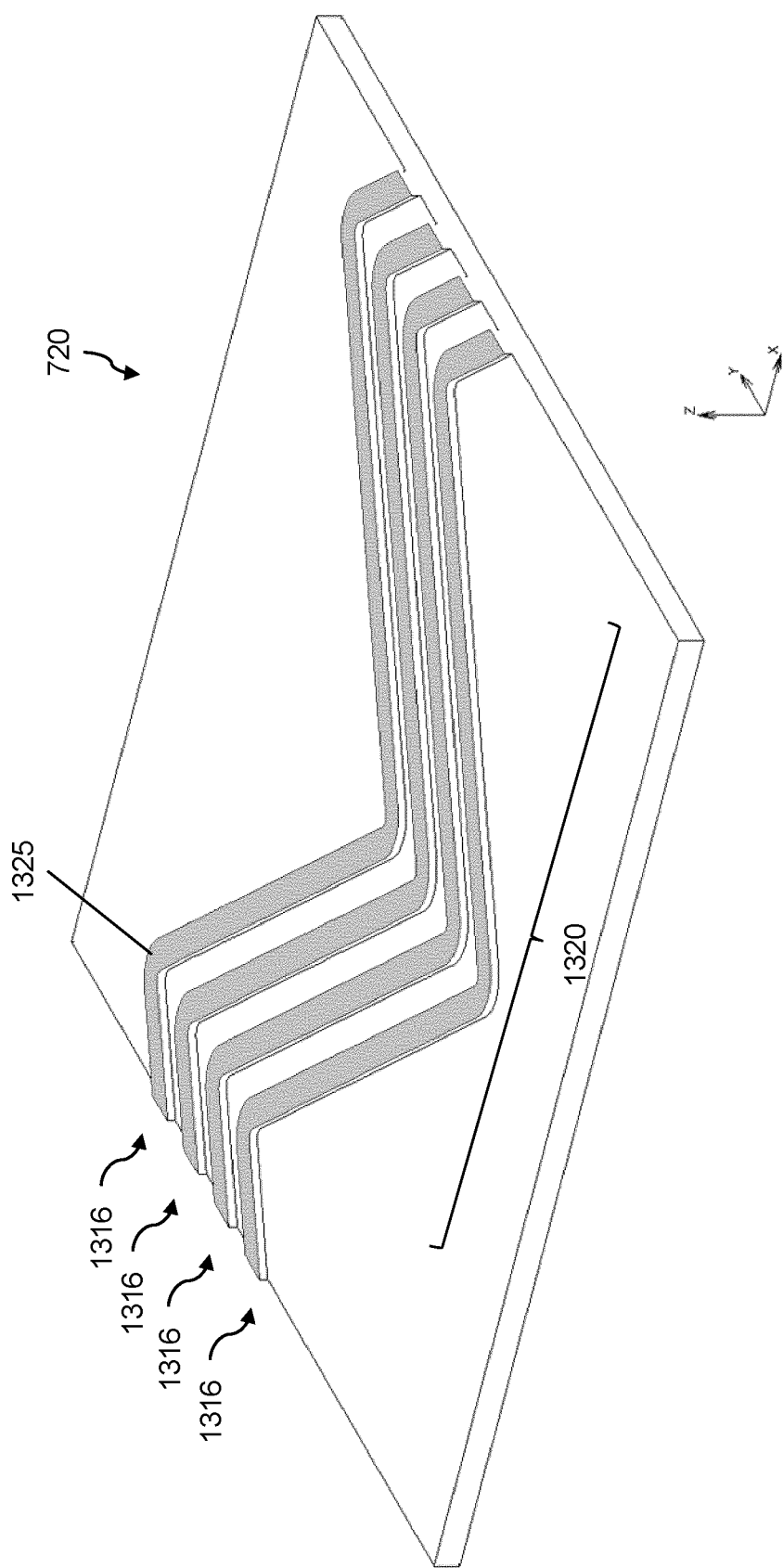
FIG. 13 is a schematic representation of a plurality of zig-zag-patterned electrical traces of a flex circuit attachment portion, in accordance with at least one embodiment of the present disclosure.

FIG. 13 is a schematic representation of a plurality of zig-zag pattern electrical traces 1316 of a flex circuit attachment portion 720, in accordance with at least one embodiment of the present disclosure. The electrical traces 1316 each include a plurality of zig-zag bends 1320 that define a single pathway for each electrical trace 1216. Each zig-zag bend includes rounded corners 1325, which may be desirable as cracks in the conductive trace 1316 may be less likely to form and propagate at a rounded corner 1325 than at a sharp, angular one. In some embodiments, each conductive trace 1316 leads to a single electrical contact or weld pad. In some embodiments, the plurality of zig zag traces 1316 form a single conductor path of multiple redundant, co-extensive traces leading to a single weld pad.

Figure 14:
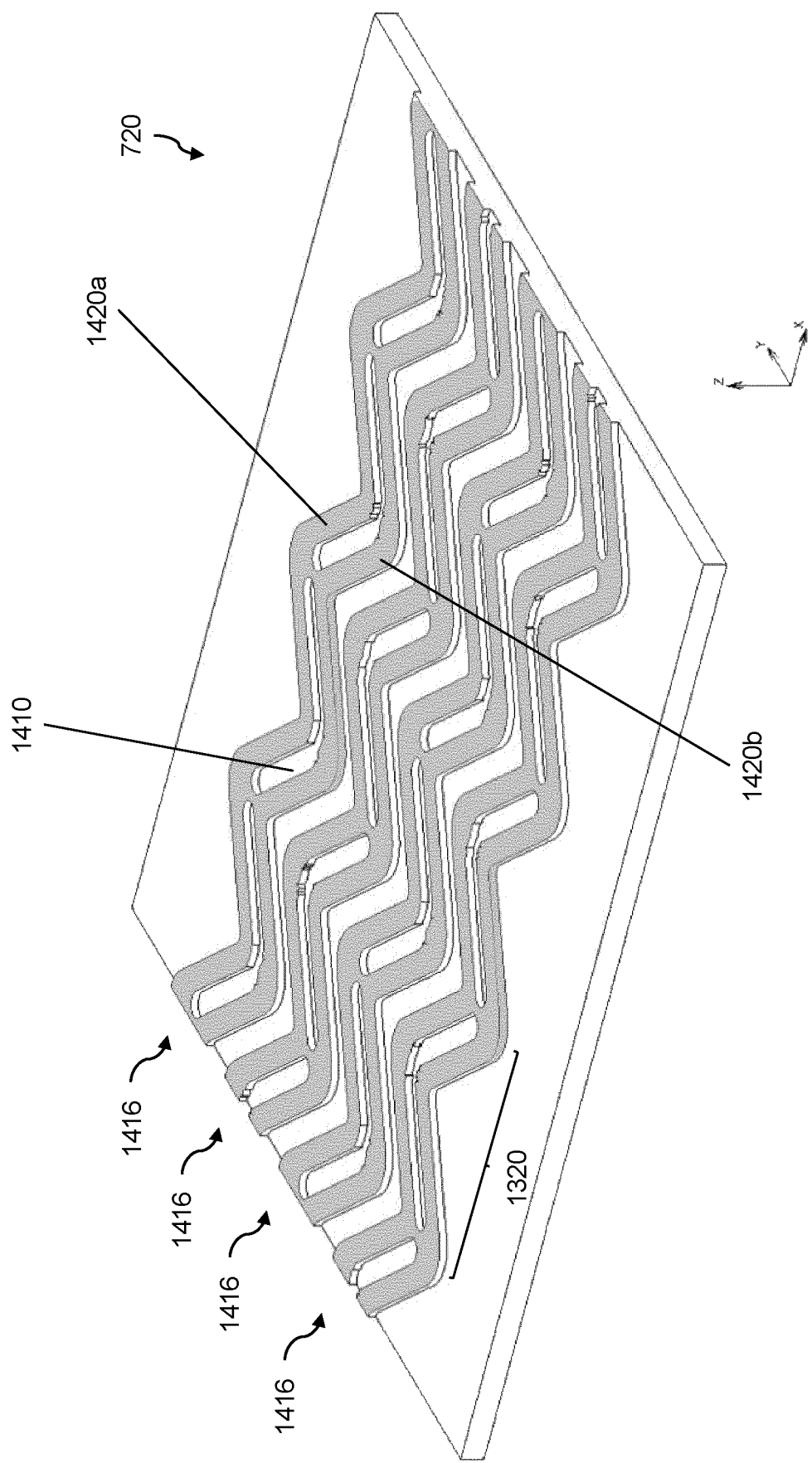
FIG. 14 is a schematic representation of a plurality of electrical traces of a flex circuit attachment portion, in accordance with at least one embodiment of the present disclosure.

FIG. 14 is a schematic representation of a plurality of electrical traces 1416 of a flex circuit attachment portion 720, in accordance with at least one embodiment of the present disclosure. The electrical traces 1416 each include a plurality of bends 1320 that combine elements of a sinusoidal and a zig-zag arrangement with rounded corners. Each trace 1416 also includes a plurality of openings 1410 that define two redundant but interconnected pathways 1420a and 1420b for each electrical trace 1416. In some embodiments, the openings 1410 have rounded corners or a zig-zag or sinusoidal shape, or combinations thereof.

Figure 15:
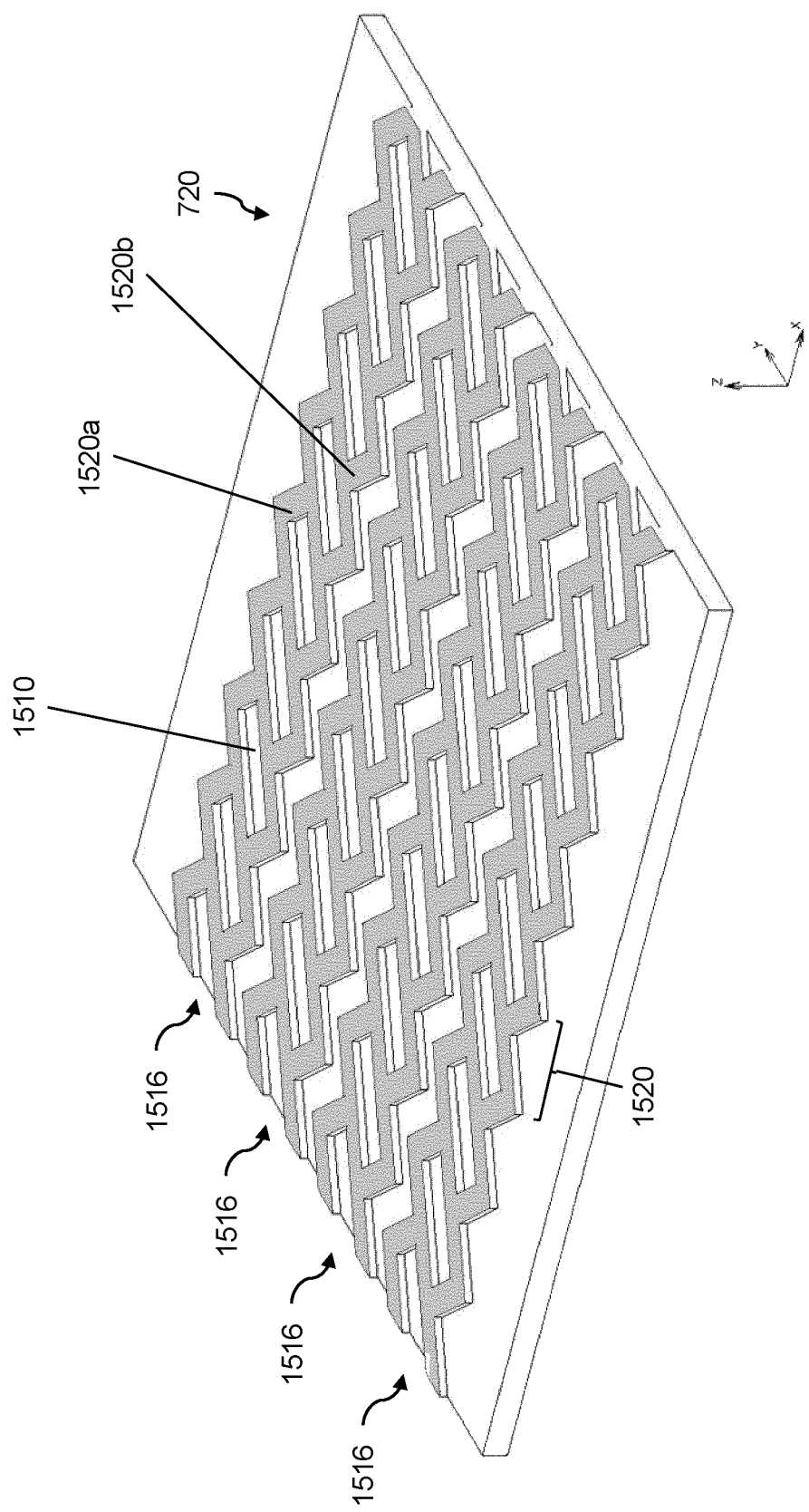
FIG. 15 is a schematic representation of a plurality of brick-patterned electrical traces of a flex circuit attachment portion, in accordance with at least one embodiment of the present disclosure.

FIG. 15 is a schematic representation of a plurality of brick-patterned electrical traces 1516 of a flex circuit attachment portion 720, in accordance with at least one embodiment of the present disclosure. In some aspects, the brick patterned electrical traces 1516 may be referred to as a braided pattern of electrical traces. The electrical traces 1516 each include a plurality of zig-zags 1520 and (e.g., rectangular) openings 1510 that define two redundant but interconnected pathways 1420*a* and 1420*b* for each electrical trace 1516. Thus, the pattern of alternating curves comprises redundant zig-zag patterns periodically connected to one another. In some embodiments, the zig-zags 1520 and openings 1510 have sharp corners as shown. In other embodiments, the zig-zags 1520 and/or openings 1510 have rounded corners or sinusoidal shapes, or combinations thereof.

Figure 16:
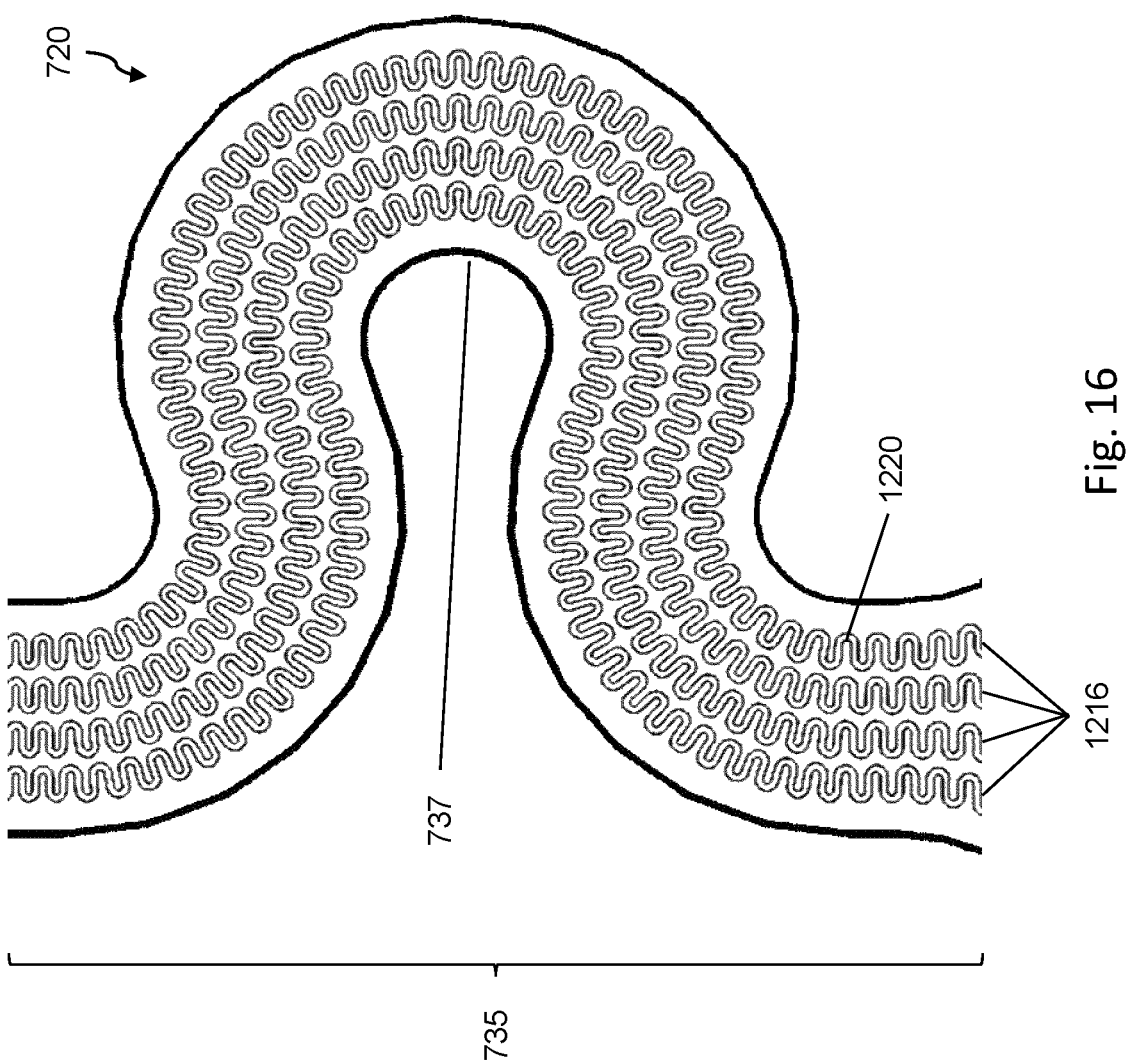
FIG. 16 is a top view of a curved intermediate region of a flex circuit attachment portion in a flattened state, in accordance with at least one embodiment of the present disclosure.

FIG. 16 is a top view of a curved intermediate region 735 of a flex circuit attachment portion 720 in a flattened (unrolled) state, in accordance with at least one embodiment of the present disclosure. The intermediate region 735 has a strain-relieving bend 737 resulting in a shape for the intermediate region 735 that may be variously described as C-shaped, horseshoe-shaped, serpentine, strain-relieving, or otherwise. In some instances, multiple C-shapes may be employed, either facing the same direction or facing in different directions. It should be understood that other numbers of bends may be used instead or in addition, resulting in shapes for the intermediate region 735 that may be variously described as sinusoidal, S-shaped, or otherwise. In some embodiments, other strain-relieving shapes for the intermediate region 735 may be used instead or in addition, including but not limited to dogleg, zig-zag, lightning bolt, or polygon shapes. The intermediate region 735 of the flex circuit connection portion also includes a plurality of sinusoidal conductive traces 1216 following the contour or curved path of the intermediate region 735, each comprising a plurality of strain-relieving 180-degree bends 1220, or a combination of other bends resulting in the sinusoidal shape. The conductive traces 1216 alternate or bend relative to the curved path of the intermediate region 735 of the attachment portion 720. The combination of strain-relieving bends 1220 in the traces 1216 and a strain-relieving shape for the intermediate region 735 may minimize the risk of a failure-inducing trace fracture more than would either of these features alone.

Figure 17:
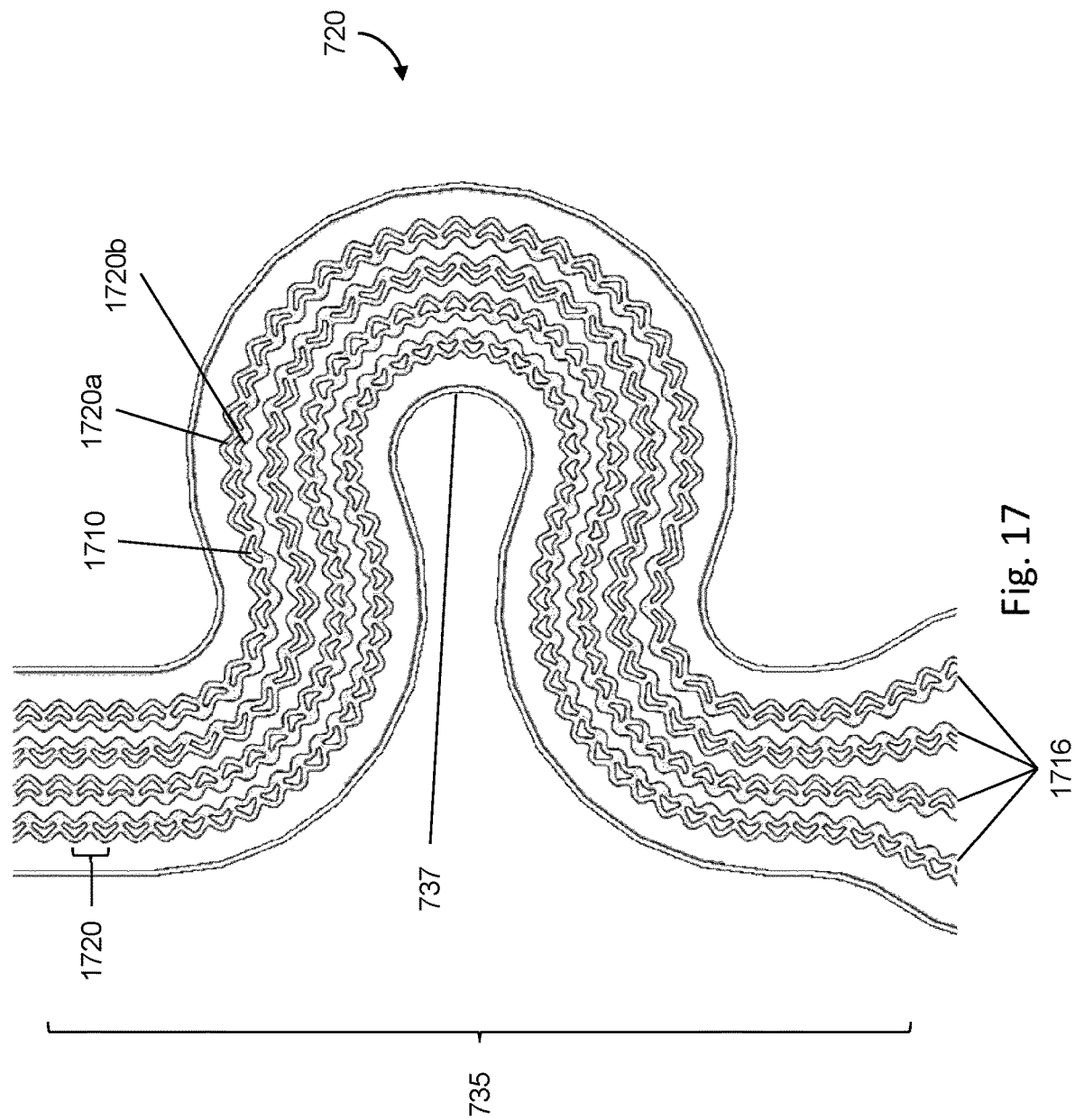
FIG. 17 is a top view of a curved intermediate region of a flex circuit attachment portion in a flattened state, in accordance with at least one embodiment of the present disclosure.

FIG. 17 is a top view of a curved intermediate region 735 of a flex circuit attachment portion 720 in a flattened (unrolled) state, in accordance with at least one embodiment of the present disclosure. As with the example in FIG. 16, the intermediate region 735 has a strain-relieving bend 737, or series of bends, resulting in a shape for the intermediate region 735 that may be variously described as C-shaped, horseshoe-shaped, strain-relieving, or otherwise. In some embodiments, other strain-relieving shapes for the intermediate region 735 may be used instead or in addition, including but not limited to S-shaped, sinusoidal, dogleg, zig-zag, lightning bolt, or polygonal.

The intermediate region 735 of the flex circuit connection portion also includes a plurality of conductive traces 1716 following the shape of the intermediate region 735. Each conductive trace 1716 comprises a plurality of strain-relieving chevron shapes 1720. Each chevron shape 1720 includes a chevron-shaped opening 1710 that defines two redundant but interconnected pathways 1720*a* and 1720*b*. Thus, the pattern of alternating curves comprises redundant zig-zag patterns periodically connected to one another. In an example, the chevrons 1720 and chevron-shaped openings 1710 are rounded such that they include no sharp corners that might facilitate the initiation or propagation of cracks in the traces 1716. In some embodiments, the chevrons 1720 of a given conductive trace 1716 face in an opposite direction to the chevrons 1720 of immediately neighboring traces 1716.

The arrangement shown in FIG. 17 includes strain-relieving features both in the intermediate region 735 of the attachment portion 720 and in the traces 1716 that follow the contours of the intermediate region 735. The traces 1716 further include a plurality of redundant, interconnected pathways 1720*a* and 1720*b*. In some embodiments, the width and thickness of the pathways is sufficient to carry the electrical signals necessary to operate the scanner body 110, but not large enough to substantially increase the risk of crack formation and propagation. In an example, the traces 1716 are between 14 and 20 micrometers wide, and spaced 14 to 20 micrometers apart. In another example, the traces 1716 are 14 micrometers wide, and spaced 16-18 micrometers apart. Traces may for example be 2 microns thick. This combination of features may advantageously minimize the risk of a failure-inducing fracture across the entire width of any of the electrical traces 1716. It is noted that the strain-relieving properties of the aforementioned features are independent of size, and work for devices both larger and smaller than those described herein.

Figure 18:
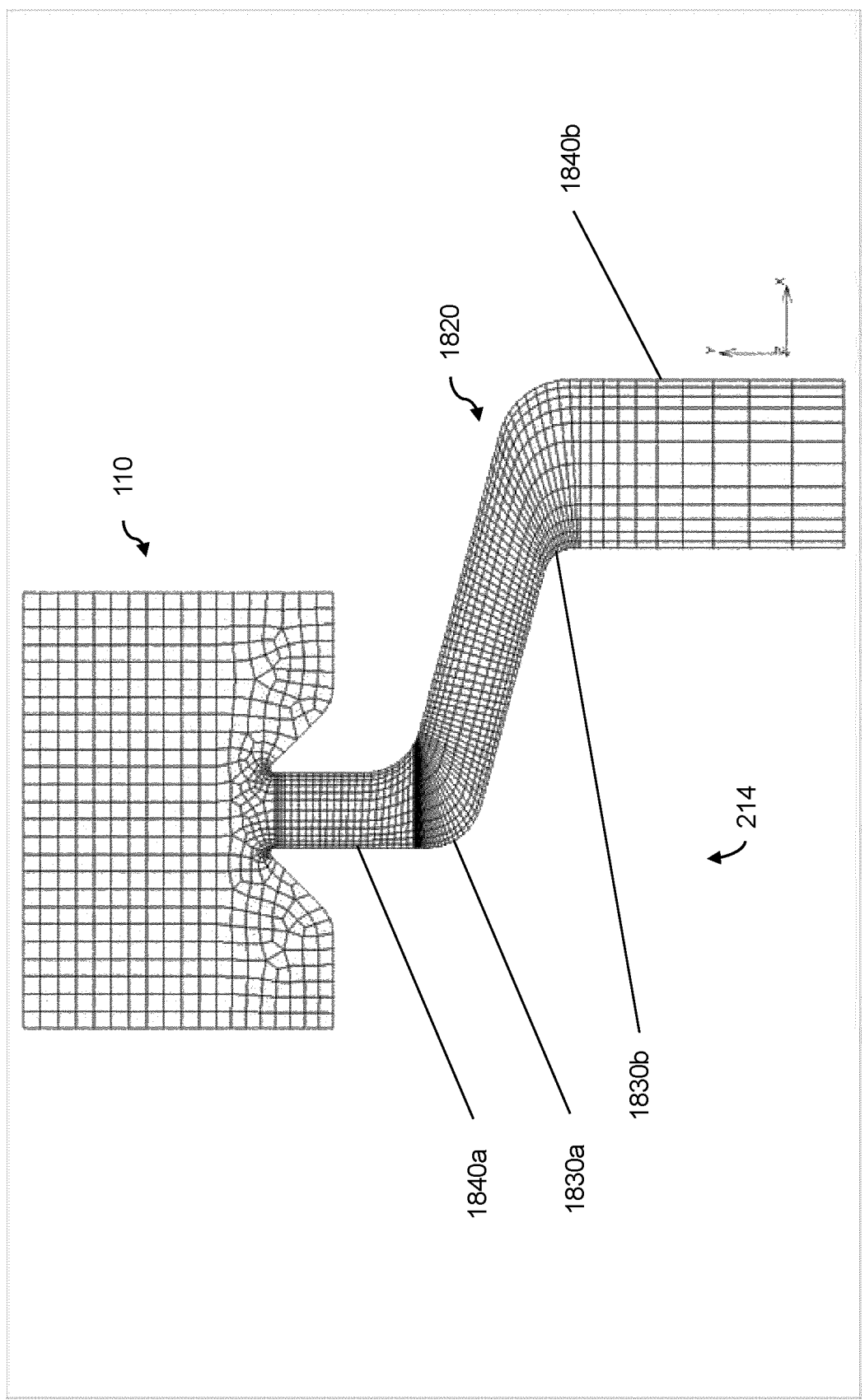
FIG. 18 is a top schematic view of a curved flex circuit connection portion in a flattened state, in accordance with at least one embodiment of the present disclosure.

FIG. 18 is a top schematic view of a curved flex circuit connection portion 1820 in a flattened (unrolled) state, in accordance with at least one embodiment of the present disclosure. Visible are the scanner portion 110 and connection portion 1820 of the flexible substrate 214. In the example shown in FIG. 18, the connection portion 1820 includes a first bend or curve 1830*a* and a second bend or curve 1830*b* that form a dogleg or zig-zag pattern. The connection portion 1820 also includes a first longitudinal portion 1840*a* and a second longitudinal portion 1840*b*. The first and second longitudinal portions 1840*a*, 1840*b* are substantially parallel. The curves 1830*a*, 1830*b* are configured such that the first and second longitudinal portions 1840*a*, 1840*b* extend longitudinally along the flexible elongate member when the flex circuit is wrapped around the cylindrical body and attached to the distal portion of the flexible elongate member of the catheter.

Figure 19:
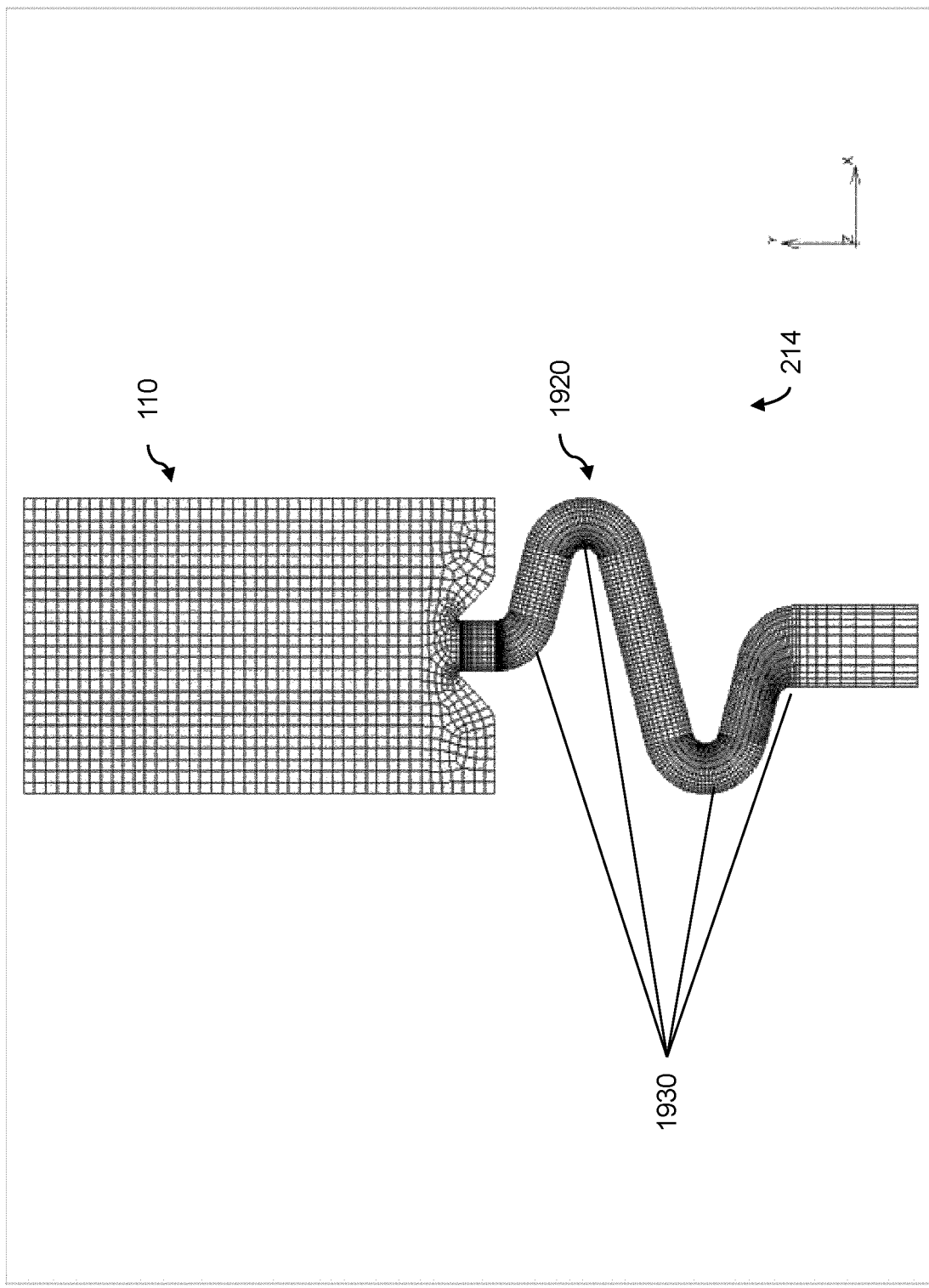
FIG. 19 is a top schematic view of a curved flex circuit connection portion in a flattened state, in accordance with at least one embodiment of the present disclosure.

FIG. 19 is a top schematic view of a curved flex circuit connection portion 1920 in a flattened (unrolled) state, in accordance with at least one embodiment of the present disclosure. Visible are the scanner portion 110 and connection portion 1920 of the flexible substrate 214. In the example shown in FIG. 19, the connection portion 1920 includes bends 1930 that form a rounded zig-zag pattern, which may also be referred to as a serpentine pattern.

Figure 20:
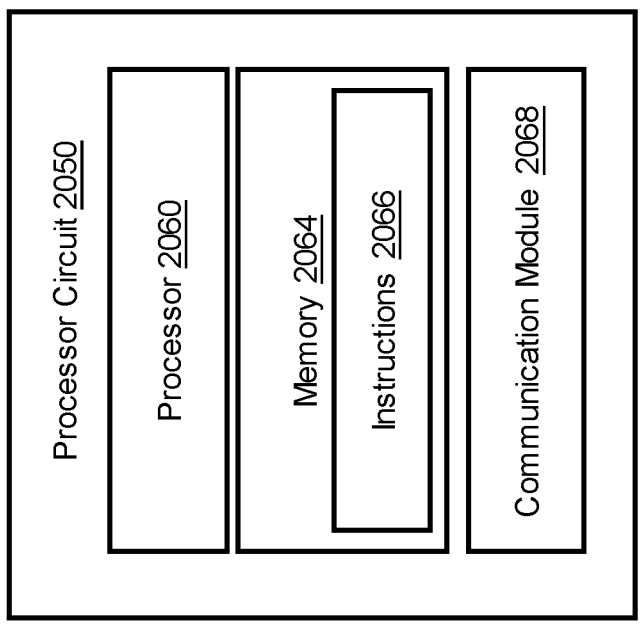
FIG. 20 is a schematic diagram of a processor circuit, in accordance with aspects of the present disclosure.

FIG. 20 is a schematic diagram of a processor circuit 2050, in accordance with aspects of the present disclosure. The processor circuit 2050 may be implemented in the ultrasound imaging system 100, or other devices or workstations (e.g., third-party workstations, network routers, etc.), or on a cloud processor or other remote processing unit, as necessary to implement the method. As shown, the processor circuit 2050 may include a processor 2060, a memory 2064, and a communication module 2068. These elements may be in direct or indirect communication with each other, for example via one or more buses.

The processor 2060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 2060 may also comprise another hardware device, a firmware device, or any combination thereof configured to perform the operations described herein. The processor 2060 may also be implemented as a combination of computing devices, e.g., a combination of a DSP and a microprocessor, a plurality of microprocessors, one or more microprocessors in conjunction with a DSP core, or any other such configuration.

The memory 2064 may include a cache memory (e.g., a cache memory of the processor 2060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 2064 includes a non-transitory computer-readable medium. The memory 2064 may store instructions 2066. The instructions 2066 may include instructions that, when executed by the processor 2060, cause the processor 2060 to perform the operations described herein. Instructions 2066 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 2068 can include any electronic circuitry and/or logic circuitry to facilitate direct or indirect communication of data between the processor circuit 2050, and other processors or devices. In that regard, the communication module 2068 can be an input/output (I/O) device. In some instances, the communication module 2068 facilitates direct or indirect communication between various elements of the processor circuit 2050 and/or the ultrasound imaging system 100. The communication module 2068 may communicate within the processor circuit 2050 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Persons skilled in the art, after becoming familiar with the teachings herein, will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An intraluminal ultrasound imaging device, comprising:
a flexible elongate member configured to be positioned within a body lumen of a patient; and
an ultrasound imaging assembly coupled to a distal portion of the flexible elongate member and comprising:
a flexible substrate comprising a scanner body portion and an attachment portion extending proximally from the scanner body portion, wherein the attachment portion defines a curved path comprising a first curve curving in a first direction and a second curve curving in a different second direction;
one or more control circuits mounted on the scanner body portion;
one or more transducer elements mounted on the scanner body portion and in communication with the one or more control circuits; and
a plurality of conductive traces disposed on the attachment portion, wherein the plurality of conductive traces is in electrical communication with the one or more control circuits, wherein the plurality of conductive traces follows the curved path of the attachment portion, and wherein each conductive trace comprises a pattern that bends relative to the curved path of the attachment portion wherein the pattern of each conductive trace comprises a sinusoidal shape.

2. The device of claim 1, wherein the curved path comprises a horseshoe shape.

3. The device of claim 1, wherein the curved path comprises a serpentine shape.

4. The device of claim 1, wherein the flexible elongate member comprises an inner member, wherein a proximal region of the attachment portion is attached to the inner member, and wherein an intermediate region of the attachment portion is detached from the inner member such that the intermediate region of the attachment portion is configured to move relative to the inner member.

5. The device of claim 4, wherein a width of the proximal region of the attachment portion is greater than a width of the intermediate region of the attachment portion.

6. The device of claim 4, wherein the flexible elongate member further comprises an outer member positioned around the inner member and the attachment portion of the flexible substrate, wherein the outer member retains the attachment portion of the flexible substrate in a rolled configuration such that the attachment portion is disposed around at least a portion of a circumference of the inner member and within an annular space between the inner member and the outer member.

7. The device of claim 6, further comprising a plurality of conductors extending along a length of the flexible elongate member,
wherein the proximal region of the attachment portion comprises a plurality of electrical contacts coupled to the plurality of conductive traces, wherein the plurality of conductors are electrically connected to the plurality of conductive traces via the plurality of electrical contacts.

8. The device of claim 7, wherein the plurality of conductors extends within the annular space between the inner member and the outer member.

9. The device of claim 4, wherein the flexible elongate member comprises a longitudinal axis, and wherein the proximal region of the attachment portion comprises a rectangular shape and is aligned with the longitudinal axis.

10. The device of claim 9, wherein a region of the attachment portion between the first and second curves are oriented at an angle of 60-90 degrees relative to the longitudinal axis.

11. An intraluminal ultrasound imaging device, comprising:
- a flexible elongate member configured to be positioned within a body lumen of a patient; and
- an ultrasound imaging assembly coupled to a distal portion of the flexible elongate member and comprising:
    - a flexible substrate comprising a scanner body portion and an attachment portion extending proximally from the scanner body portion, wherein the attachment portion defines a curved path comprising a first curve curving in a first direction and a second curve curving in a different second direction;
    - one or more control circuits mounted on the scanner body portion;
    - one or more transducer elements mounted on the scanner body portion and in communication with the one or more control circuits; and
- a plurality of conductive traces disposed on the attachment portion, wherein the plurality of conductive traces is in electrical communication with the one or more control circuits, wherein the plurality of conductive traces follows the curved path of the attachment portion, and wherein each conductive trace comprises a pattern that bends relative to the curved path of the attachment portion wherein the pattern of each conductive trace comprises a braided shape.

12. The device of claim 11, further comprising a rigid tubular member, and wherein the scanner body portion is positioned around the rigid tubular member.

13. The device of claim 12, wherein the attachment portion is positioned proximally of the one or more transducer elements and the one or more control circuits.

14. The device of claim 13, wherein the attachment portion extends proximally of the rigid tubular member.

15. The device of claim 13, wherein a width of the scanner body portion is greater than a width of the attachment portion.

16. An intraluminal ultrasound imaging device, comprising:
- a flexible elongate member configured to be positioned within a body lumen of a patient; and
- an ultrasound imaging assembly coupled to a distal portion of the flexible elongate member and comprising:
    - a flexible substrate comprising a scanner body portion and an attachment portion extending proximally from the scanner body portion, wherein the attachment portion defines a curved path comprising a first curve curving in a first direction and a second curve curving in a different second direction;
    - one or more control circuits mounted on the scanner body portion;
    - one or more transducer elements mounted on the scanner body portion and in communication with the one or more control circuits; and
- a plurality of conductive traces disposed on the attachment portion, wherein the plurality of conductive traces is in electrical communication with the one or more control circuits, wherein the plurality of conductive traces follows the curved path of the attachment portion, and wherein each conductive trace comprises a pattern that bends relative to the curved path of the attachment portion wherein the pattern of each conductive trace comprises redundant zig-zag patterns periodically connected to one another.

* * * * *